US008324335B2

(12) United States Patent
Ito et al.

(10) Patent No.: US 8,324,335 B2
(45) Date of Patent: Dec. 4, 2012

(54) PROPYLENE-BASED POLYMER AND METHOD FOR PRODUCING THE SAME, AND PROPYLENE-BASED RESIN COMPOSITION

(75) Inventors: Masaaki Ito, Yokkaichi (JP); Hideshi Uchino, Yokkaichi (JP); Kazuya Sakata, Yokkaichi (JP); Masaru Aoki, Yokkaichi (JP); Masato Nakano, Yokkaichi (JP); Shinichi Kitade, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 568 days.

(21) Appl. No.: 12/514,323

(22) PCT Filed: Nov. 16, 2007

(86) PCT No.: PCT/JP2007/072317
§ 371 (c)(1),
(2), (4) Date: Feb. 3, 2010

(87) PCT Pub. No.: WO2008/059969
PCT Pub. Date: May 22, 2008

(65) Prior Publication Data
US 2010/0168323 A1    Jul. 1, 2010

(30) Foreign Application Priority Data
Nov. 17, 2006   (JP) .................................. 2006-311249

(51) Int. Cl.
*C08F 210/06* (2006.01)
*C08F 210/16* (2006.01)
*C08L 23/14* (2006.01)

(52) U.S. Cl. ............. 526/348; 526/79; 526/87; 525/240

(58) Field of Classification Search .................. 526/348, 526/161, 172; 525/240
See application file for complete search history.

(56) References Cited

U.S. PATENT DOCUMENTS

| | | | |
|---|---|---|---|
| 5,414,027 A * | 5/1995 | DeNicola et al. ............. | 522/112 |
| 5,891,946 A * | 4/1999 | Nohara et al. ................ | 524/427 |
| 6,034,177 A * | 3/2000 | Sobajima et al. ............. | 525/88 |
| 6,184,327 B1 * | 2/2001 | Weng et al. .................. | 526/351 |
| 6,204,336 B1 * | 3/2001 | Hirakawa et al. ............ | 525/244 |
| 6,218,023 B1 * | 4/2001 | DeNicola et al. ............. | 428/515 |
| 6,306,518 B1 * | 10/2001 | Shah et al. ................... | 428/516 |
| 6,586,531 B2 * | 7/2003 | Washiyama et al. ......... | 525/240 |
| 6,825,280 B1 * | 11/2004 | Hayakawa et al. ........... | 525/240 |
| 6,887,940 B2 * | 5/2005 | Dang et al. ................... | 525/191 |
| 7,915,359 B2 * | 3/2011 | Kitade et al. ................. | 526/160 |
| 8,080,624 B2 * | 12/2011 | Ito et al. ....................... | 526/351 |
| 2006/0155069 A1 * | 7/2006 | Berta et al. ................... | 525/192 |
| 2006/0155073 A1 | 7/2006 | Oobayashi et al. | |

FOREIGN PATENT DOCUMENTS

| | | |
|---|---|---|
| EP | 0 366 411 | 5/1990 |
| JP | 57 67611 | 4/1982 |
| JP | 61 152442 | 7/1986 |
| JP | 9 48831 | 2/1997 |
| JP | 9 87343 | 3/1997 |
| JP | 10 338704 | 12/1998 |
| JP | 2001 525460 | 12/2001 |
| JP | 2001 525461 | 12/2001 |
| JP | 2001 525463 | 12/2001 |
| JP | 2002 275225 | 9/2002 |
| JP | 2003 327642 | 11/2003 |
| JP | 2004 18647 | 1/2004 |
| JP | 2004 35769 | 2/2004 |
| JP | 2004 143434 | 5/2004 |
| JP | 2005 139282 | 6/2005 |
| WO | 95 27741 | 10/1995 |
| WO | 01 07493 | 2/2001 |
| WO | 02 079322 | 10/2002 |
| WO | 2006 075637 | 7/2006 |

OTHER PUBLICATIONS

Resconi, Luigi et al., "Olefin polymerization at bis(pentamethylcyclopentadienyl)zirconium and -hafnium centers: chain-transfer mechanisms", J. Am. Chem. Soc., vol. 114, No. 3, pp. 1025-1032, (1992).
Shiono, Takeshi et al., "Copolymerization of Atactic Polypropene Macromonomer with Propene by an Isospecific Metallocene Catalyst", Macromolecules, Articles, vol. 32, No. 18, pp. 5723-5727, (1999).
Weng, Weiqing et al., "Synthesis of vinyl-terminated isotactic poly(propylene)", Macromolecul. Rapid Commun., vol. 21, No. 16, pp. 1103-1107, (2000).
Weng, Weiqing et al., "Synthesis of Long-Chain Branched Propylene Polymers via Macromonomer Incorporation", Macromol. Rapid Commun., vol. 22, No. 18, pp. 1488-1492, (2001).
Chung, T.C., Prog. Polym. Soci., vol. 27, pp. 70-71, (2002).
Lohse, David J. et al., "Graft copolymer compatibilizers for blends of polypropylene and ethylene-propylene copolymers", Macromolecules, vol. 24, No. 2, pp. 561-566, (1991).

* cited by examiner

*Primary Examiner* — Rip A. Lee
(74) *Attorney, Agent, or Firm* — Oblon, Spivak, McClelland, Maier & Neustadt, L.L.P.

(57) ABSTRACT

A propylene-based polymer comprising the following component (A) insoluble in p-xylene at 25° C. and component (B) soluble in p-xylene at 25° C., wherein (i) the weight average molecular weight (Mw) measured with GPC is 100,000 to 1,000,000, (ii) the content of the component insoluble in hot p-xylene is 0.3% by weight or lower, and (iii) the degree of strain hardening ($\lambda$ max) in measurement of elongational viscosity is 2.0 or higher; and a method for producing the same, along with a resin composition comprising a propylene-ethylene copolymer (Z) in an amount of 50.0 to 99.9% by weight and a propylene-based polymer (M) in an amount of 0.1 to 50.0% by weight.
Component (A): a component (CXIS) insoluble in p-xylene at 25° C., having requirements specified by (A1) to (A5).
Component (B): a component (CXS) is soluble in p-xylene at 25° C., having requirements specified by (B1) to (B4).

20 Claims, 5 Drawing Sheets

PROPYLENE-BASED POLYMER AND METHOD FOR PRODUCING THE SAME, AND PROPYLENE-BASED RESIN COMPOSITION

CROSS-REFERENCE TO RELATED APPLICATIONS

The present application is a national stage application, under 35 U.S.C. 371, of International Application No. PCT/JP2007/072317, filed on Nov. 16, 2007, and in turn claims priority to JP 2006-311249 filed on Nov. 17, 2006, the entire contents of each of which are hereby incorporated herein by reference.

BACKGROUND OF THE INVENTION

1. Field of the Invention

The present invention relates to a propylene-based polymer and a method for production the same, along with a propylene-based resin composition with excellent impact resistance, and in more detail, relates to a propylene-based polymer having excellent mechanical properties such as impact resistance or tensile strength at break while maintaining high rigidity, and also having improved melt fluidity and excellent moldability and appearance, and a method for production the same, along with a propylene-based resin composition characterized by containing, as an impact modifier component, a propylene-ethylene copolymer component, which is constituted of a crystalline propylene polymer component and a propylene-ethylene random copolymer component, having the propylene-ethylene copolymer component, which is produced by a multi-stage polymerization method, as a main component, and containing a copolymer, where a part of the crystalline propylene polymer component and the propylene-ethylene random copolymer component, which are produced sequentially by a multi-stage polymerization, is chemically bonded. In addition, the present invention relates to a propylene-based polymer resin composition, which has remarkably improved impact resistance, containing further ethylene/α-olefin-based elastomer or styrene-based elastomer, and an inorganic filler, in addition to the above components.

2. Background of the Prior Art

Conventionally, polypropylene has been used widely in various fields, because of having features of high melting point, high tensile strength, high rigidity and chemical resistance. However, a homopolymer of propylene with a single composition alone has a defect of being brittle against deformation, and has a problem of insufficient property such as impact resistance or tensile elongation at break. In addition, usual polypropylene has a problem that melt tension and melt viscoelasticity are low, which limits applications to thermoforming, foaming, blow molding and the like. Still more, there is a defect that poor non-Newtonian property and small swell result in deteriorated appearance such as generation of flow-mark in a molded article.

As a method for improving the above impact resistance or tensile elongation at break of polypropylene, such a method has been used often that produces a block copolymer by blending a crystalline propylene-based polymer component and an elastomer component in a polymerization step.

This blended substance is generally called a propylene-based block copolymer, however, it is not, in the strict sense, a block copolymer, where the crystalline propylene-based polymer component and the elastomer component are chemically bonded. Therefore, the elastomer component results in coarse phase separation, in the crystalline propylene-based polymer component, and there has been limitation as a method for improving impact resistance or tensile elongation at break.

In view of such circumstance, it has been desired to be capable of producing a block copolymer, where the crystalline propylene-based polymer component and the elastomer component are truly bonded chemically, as a method for controlling a phase separated structure and improving impact resistance or tensile elongation at break.

As a method for producing such a block copolymer, it is thought of a method for copolymerizing a propylene-based macromer having a copolymerizable vinyl group at the terminal, and propylene or the like, however, when a catalyst for PP polymerization like a conventional Ziegler-Natta catalyst is used, a terminal structure results in a saturated alkyl terminal, which is mainly generated by chain transfer with hydrogen, and not a copolymerizable macromer. In addition, even a by-produced unsaturated alkyl terminal is generated as a not copolymerizable vinylidene terminal, therefore it was impossible to produce a block copolymer, where the crystalline propylene-based polymer component and the elastomer component are truly bonded chemically.

Incidentally, it has been known that a vinyl structure can be synthesized preferentially at a terminal, when a complex having a peculiar structure is used (for example, refer to Patent Literature 1, Non-Patent Literature 1, 3 and the like). And there has been disclosed a method for synthesizing a propylene-based macromer by using such a complex, and then copolymerizing with propylene (refer to Patent Literature 2, 3, Non-Patent Literature 2, 4 and the like).

However, compounds disclosed in Patent Literature 2 and Non-Patent Literature 4, although having a branched structure, because of not being constituted of the crystalline propylene-based polymer component and the elastomer component, do not show improved mechanical properties such as impact resistance. In addition, molecular weight of the side chain of the compound disclosed in Patent Literature 2 is, as Mn, 13,000 (about 25,000 as Mw) at the highest, and not sufficiently high, which provides only insufficient improvement effect of melt properties. In addition, modification effect to enhance mechanical properties is not sufficient.

In addition, compounds disclosed in Patent Literature 3 and Non-Patent Literature 2, because of using atactic polypropylene (atactic PP) as an amorphous moiety, result in denaturing a structure of the matrix itself, which the crystalline propylene-based polymer constitutes, and has a problem of deterioration of mechanical properties such as rigidity. In addition, molecular weight of the side chain of the compound disclosed in Patent Literature 3 is, as Mn, 15,700 (about 30,000 as Mw) at the highest, and not sufficient as molecular weight of the side chain, which provides only insufficient improvement effect of melt properties. In addition, modification effect to enhance mechanical properties is not sufficient.

In view of the above circumstance, there have been disclosed propylene-based copolymers having a structure having, as the side chain, an amorphous polymer with composition different from the crystalline propylene-based polymer as an amorphous moiety. For example, there have been disclosed propylene-based copolymers suitable as a compatibilizer of a propylene-based homopolymer and a propylene-based copolymer, specifically, propylene-based copolymers having an ethylene-propylene-based copolymer, as the side chain (refer to Patent Literature 4, 5).

However, these propylene-based copolymers, because of insufficient length of the branched chain, have insufficient effect to improve melt properties.

Still more, in order to improve these defects, there has been disclosed a compound obtained by copolymerizing a high molecular weight EPR macromer, and a production method (refer to Patent Literature 6 etc.), however, molecular weight of the side chain is, as Mn, 14,900 (about 25,200 as Mw) at the highest, and still not sufficient to attain high molecular weight, resulting in insufficient improvement effect of melt properties.

In addition, these methods require use of slurry polymerization at relatively high temperature and under low pressure, to efficiently generate a macromer having a vinyl structure at the terminal, which is not preferable in view of production efficiency and environmental load.

In addition, there have been disclosed the compounds obtained by copolymerization of α, ω-diene, in order to efficiently synthesize an EPR macromer and a PP macromer having a vinyl group at the terminal (refer to Patent Literature 7, 8 etc.).

However, when α, ω-diene is used, there is a problem that a cross-linking reaction is proceeded simultaneously with copolymerization, resulting in gel. In addition, residue of unreacted α, ω-diene in a copolymer produced by such a method raises a problem that odor is left even after converting the compounds to a composition or a molded article.

In view of the above problems, T. C. Chung et. al. have devised a polymerization method for branching isotactic PP, and a structure of the resulting branched compound (refer to Non-Patent Literature 5 etc.), however, this method requires use of a styrene derivative at a branch site, which raises a problem of amount of the branch sites or chemical stability of the branched sites. In addition, because the compound contains a benzene ring, it may generate a problem of also cleanness of the polymer.

Still more, there has been disclosed the grafting technology of isotactic PP on to diene moieties of ethylene-propylene-diene methylene rubber (hereafter referred to as EPDM) (refer to Patent Literature 9, Non-Patent Literature 6 etc.), however, molecular weight of the segment containing crystalline ethylene of the main chain is about 30,000, and not sufficient, which provides insufficient improvement effect of melt properties.

In addition, a polypropylene resin to be held an important position as an industrial material, is very excellent in rigidity or heat resistance or the like, however, because of having relatively low impact resistance, which is important as property, there has been known conventionally a method for enhancing impact resistance by making a propylene-ethylene random copolymer or a composition by blending polypropylene and a copolymer thereof.

Among them, such a composition obtained by a series of polymerization steps, that is, typically, one obtained by producing crystalline polypropylene in the first step, and a propylene-ethylene random copolymer in the second step, is usually called a propylene-ethylene block copolymer.

Such a propylene-ethylene block copolymer is industrially produced, usually, by using a Ziegler-Natta-based catalyst, however, it has been known that the Ziegler-Natta-based catalyst generally has a plurality kinds of active sites (so called multi-sites), and provides wide molecular weight distribution or wide comonomer composition distribution of a propylene-ethylene copolymer moiety. Thus, the propylene-ethylene block copolymer produced by using the Ziegler-Natta-based catalyst provides a molded article having relatively good rigidity-impact resistance balance, due to having wide composition distribution, and also having good moldability due to wide molecular weight distribution. Thus, because the propylene-ethylene block copolymer produced by using the Ziegler-Natta-based catalyst exerts excellent performance in balance of various properties, it has been utilized in many industrial fields starting from automotive interior and exterior parts or packaging materials.

However, in recent concerns to resource problems, energy problems and the like, request to a material for further thinning and light weight is continual, and expectation for a propylene-ethylene block copolymer, which is an impact resistant material, to enhance impact resistance performance has been increasing more and more.

Up to now, in order to enhance rigidity or heat resistance and impact resistance etc. of such a propylene-ethylene block copolymer in good balance, it has been considered necessary to maintain more sufficient impact resistance in a copolymer component and at the same time to control compatibility between crystalline polypropylene and a copolymer component within a proper range, and a method for enhancing the compatibility, by the addition of a compatibilizer component of a polypropylene component and a copolymer moiety, has been known conventionally (for example, refer to Patent Literature 10, 11).

In these methods, in recent years, there have been disclosed copolymers, which are said to be excellent also in impact resistance at low temperature, constituted of a crystalline polypropylene component, a copolymer component having relatively low ethylene content as a compatibilizer, and a copolymer component having relatively high ethylene content, by further specifying ultimate viscosity or MFR of the each component (for example, refer to Patent Literature 12, 13).

In addition, also in order to enhance balance between rigidity or heat resistance and impact resistance of the propylene-ethylene block copolymer, produced by using a metallocene catalyst (what is called a single-site catalyst), which has been used increasingly in recent years, there has been proposed a production trial, by at least three-stage polymerization, of a propylene-based resin composition excellent in balance between rigidity or heat resistance and impact resistance, which contains a compatibilizer component of a metallocene-based propylene-ethylene copolymer, similarly as in a method for using the above Ziegler-Natta-based catalyst (refer to Patent Literature 14).

Still more, the present inventors have proposed a method for enhancing rigidity and impact resistance, by the addition, as a modifier, of a propylene-ethylene block copolymer produced by a metallocene-based catalyst constituted of at least three components, containing a compatibilizer, to a propylene-ethylene block copolymer produced by the Ziegler-Natta-based catalyst (for example, JP-application No. 2006-34573).

Thus, as a method for enhancing impact resistance of the propylene-ethylene block copolymer produced by the Ziegler-Natta-based catalyst, in many cases, by noticing compatibility between the crystalline propylene component and the propylene-ethylene random copolymer, a method for enhancing impact resistance by modifying characteristics of interface thereof has been adopted in many cases, however, enhancing compatibility of a crystalline moiety and an amorphous moiety by modification of the interface results in decrease in modulus of rigidity, therefore it can be said that enhancement of rigidity-impact resistance balance is very difficult, and there is still left room to study.

Patent Literature 1: JP-A-2001-525461
Patent Literature 2: JP-A-2001-525460
Patent Literature 3: JP-A-2001-525463
Patent Literature 4: JP-A-10-338704
Patent Literature 5: WO 01/07493

Patent Literature 6: WO 02/079322
Patent Literature 7: JP-A-2004-35769
Patent Literature 8: JP-A-2004-143434
Patent Literature 9: EP No. 366411
Patent Literature 10: JP-A-57-67611
Patent Literature 11: JP-A-61-152442
Patent Literature 12: JP-A-2003-327642
Patent Literature 13: JP-A-9-48831
Patent Literature 14: WO 95/27741
Non-Patent Literature 1: RESCONI J. Am. Chem. Soc., 1992, 114, 1025
Non-Patent Literature 2: Shiono, T. Macromolecules, 1999, 32, 5723-5727
Non-Patent Literature 3: Macromol. Rapid Commun., 2000, 21, 1103
Non-Patent Literature 4: Macromol. Rapid Commun., 2001 22, 1488
Non-Patent Literature 5: Progress in polymer science 27 (2002), p 70 to 71
Non-Patent Literature 6: Macromolecules, 1991, 24, 561

SUMMARY OF THE INVENTION

In view of the above problems, it is an object of the present invention to provide, in a propylene-based polymer and a resin composition, a propylene-based polymer having excellent mechanical properties (including balance), and also improved melt tension (MT) or melt fluidity and excellent moldability and appearance, and a method for production the same. In addition, it is an object of the present invention to provide a propylene-based polymer, which is capable of enhancing mechanical properties of a conventional propylene-ethylene block copolymer, when used as a modifier, and a method for producing the same.

Still more in view of technological improvement stream on a propylene-based resin material in the above conventional technology, it is a present state that development of a propylene-based resin material having further enhanced rigidity-impact resistance balance, is strongly desired, therefore, it is an object of the present invention to provide a propylene-based resin composition having enhanced rigidity-impact resistance balance, in particular, having remarkably enhanced impact resistance.

The present inventors have intensively studied a way to solve the above-described problems and found that firstly a propylene-based polymer having a specific structure (including branching) at a crystalline moiety and an amorphous moiety, can solve the above problem, and then, in improvement of impact resistance of a propylene-ethylene block copolymer, by obtaining a propylene-based resin composition containing as an impact modifier, a propylene-based polymer component, which is constituted of a crystalline propylene polymer component and a propylene-ethylene random copolymer component, having the propylene-ethylene copolymer component, which is produced by a multi-stage polymerization method by using, for example, a Ziegler-Natta-based catalyst, as a main component, and containing a copolymer, where a part of the crystalline propylene component and the propylene-ethylene random copolymer component, which are produced sequentially by a multi-stage polymerization, is chemically bonded, astonishingly impact resistance is enhanced remarkably, while maintaining rigidity at nearly the same level, that is, the above problem can be solved, and have thus completed the present invention based on the knowledge.

That is, according to a first aspect of the present invention, there is provided a propylene-based polymer comprising the following component (A) insoluble in p-xylene at 25° C., and component (B) soluble in p-xylene at 25° C., characterized in that (i) weight average molecular weight (Mw) measured with GPC is from 100,000 to 1,000,000, (ii) content of the component insoluble in hot p-xylene is 0.3% by weight or lower, and (iii) degree of strain hardening ($\lambda$ max) in measurement of elongational viscosity is 2.0 or higher.

the component (A) is the component insoluble in p-xylene at 25° C. (CXIS), having requirements specified by the following (A1) to (A5).

(A1) content thereof is 20% by weight or more and less than 95% by weight, relative to total weight of the polymer;

(A2) weight average molecular weight (Mw) measured with GPC is 100,000 to 1,000,000;

(A3) isotactic triad fraction (mm) measured with $^{13}$C-NMR is 93% or more;

(A4) Degree of strain hardening ($\lambda$ max) in measurement of elongational viscosity is 2.0 or higher; and (A5) it contains a propylene unit and an ethylene unit or an $\alpha$-olefin unit.

the component (B) is the component soluble in p-xylene at 25° C. (CXS), having requirements specified by the following (B1) to (B3):

(B1) content thereof is 5% by weight or more and less than 80% by weight, relative to total weight of the polymer;

(B2) weight average molecular weight (Mw) measured with GPC is 100,000 to 1,000,000; and (B3) it contains a propylene unit and an ethylene unit and/or an $\alpha$-olefin unit.

According to a second aspect of the present invention, in the first aspect, there is provided the propylene-based polymer characterized in that in the component (B), further (B4) degree of strain hardening ($\lambda$ max) in measurement of elongational viscosity is equal to or higher than 2.0.

In addition, according to a third aspect of the present invention, in the first aspect, there is provided the propylene-based polymer characterized by having a branched structure with a crystalline propylene polymer segment as a side chain, and with an amorphous propylene copolymer segment as a main chain.

Still more, according to a fourth aspect of the present invention, in the first aspect, there is provided the propylene-based polymer characterized in that the component (A) has a branched structure with a crystalline propylene polymer segment as a side chain, and with an amorphous propylene copolymer segment as a main chain.

According to a fifth aspect of the present invention, in the first aspect, there is provided the propylene-based polymer characterized in that the component (A) is one containing ethylene units, and the ethylene content is 0.1 to 10% by weight.

In addition, according to a sixth aspect of the present invention, in the first aspect, there is provided the propylene-based polymer characterized in that the component (B) is one containing ethylene units, and the ethylene content is 10 to 60% by weight.

On the other hand, according to a seventh aspect of the present invention, there is provided a method for producing the propylene-based polymer relevant to any of the first to the sixth aspects, characterized by using the following catalyst components (a), (b) and (c), and containing:

(i) a first step for polymerizing propylene only, or propylene and ethylene and/or an $\alpha$-olefin, where ethylene, the $\alpha$-olefin or total amount of ethylene and the $\alpha$m-olefin is polymerized in an amount of 0 to 10% by weight, relative to total monomer components; and (ii) a second step for polymerizing propylene and ethylene and/or the α-olefin, where ethylene, the α-olefin or total amount of ethylene and the α-olefin is polymerized in an amount of 10 to 90% by weight, relative to total monomer components:

(a): A metallocene compound represented by the general formula (1);

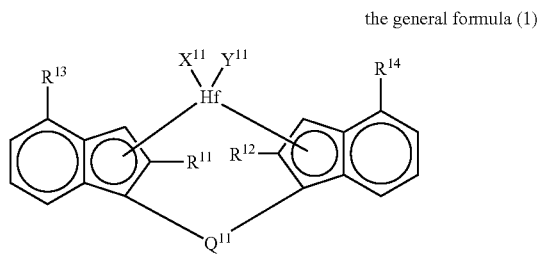

the general formula (1)

[in the general formula (1), each of $R^{11}$ and $R^{12}$ represents independently an alkyl group having carbon atoms of 1 to 6, an aryl group having carbon atoms of 6 to 16, an aryl group containing a halogen, and having carbon atoms of 6 to 16, a hetero cyclic group containing nitrogen, oxygen or sulfur, and having carbon atoms of 4 to 16, and at least one of $R^{11}$ and $R^{12}$ represents a hetero cyclic group containing nitrogen, oxygen or sulfur, and having carbon atoms of 4 to 16. In addition, each of $R^{13}$ and $R^{14}$ represents independently an alkyl group containing a halogen and having carbon atoms of 1 to 6, an aryl group having carbon atoms of 6 to 16, an aryl group containing a halogen and having carbon atoms of 6 to 16, an aryl group containing silicon and having carbon atoms of 6 to 16, and a hetero cyclic group containing nitrogen, oxygen or sulfur and having carbon atoms of 6 to 16. Still more, $X^{11}$ and $Y^{11}$ each independently represent a hydrogen atom, a halogen atom, a hydrocarbon group having carbon atoms of 1 to 20, a hydrocarbon group containing silicon and having carbon atoms of 1 to 20, a halogenated hydrocarbon group having carbon atoms of 1 to 20, a hydrocarbon group containing oxygen and having carbon atoms of 1 to 20, an amino group, or a hydrocarbon group containing nitrogen and having carbon atoms of 1 to 20; and $Q^{11}$ represents a bivalent hydrocarbon group having carbon atoms of 1 to 20, a silylene group or a germylene group which may contain a hydrocarbon group having carbon atoms of 1 to 20], (b): An ion-exchange layered silicate and (c): An organoaluminum compound.

In addition, according to a eighth aspect of the present invention, in the seventh aspect, there is provided the method for producing the propylene-based polymer characterized in that the first step is bulk polymerization using propylene as a solvent, or gas-phase polymerization where each monomer is maintained in an gaseous state, and the second step is gas-phase polymerization.

According to a ninth aspect of the present invention, there is provided a resin composition comprising a propylene-ethylene copolymer component (Z) in an amount of 50.0 to 99.9% by weight, and a propylene-based polymer component (M) in an amount of 0.1 to 50.0% by weight, characterized in that the propylene-ethylene copolymer component (Z) is obtained by sequential production by a multi-stage polymerization method of a crystalline propylene polymer component and a propylene-ethylene random copolymer component, and has the following (Z1) characteristics, and the propylene-based polymer component (M) is obtained by sequential production by a multi-stage polymerization method of a crystalline propylene polymer component, and a propylene-ethylene random copolymer component, comprises a component (A) insoluble in p-xylene at 25° C. and a component (B) soluble in p-xylene at 25° C., has a structure where the crystalline propylene polymer segment and the amorphous propylene copolymer segment are chemically bonded, and has the following (A1) and (B1) characteristics:

(Z1): Amount of the component (CXS-Z) soluble in p-xylene at 25° C. in the component (Z) is 5 to 50% by weight relative to total amount of the component (Z), and amount of the component (CXIS-Z) insoluble in p-xylene at 25° C. in the component (Z) is 50 to 95% by weight relative to total amount of the component (Z), (A1): Amount of the component (A) is 20 to 95% by weight relative to total amount of the component (M); and (B1): Amount of the component (B) is 5 to 80% by weight relative to total amount of the component (M).

According to a tenth aspect of the present invention, in the ninth aspect, there is provided the resin composition characterized in that the component (Z) is produced by using a Ziegler-Natta-based catalyst.

In addition, according to an eleventh aspect of the present invention, in the ninth aspect, there is provided the resin composition characterized in that structure of the component (M) is a branched structure with an amorphous propylene copolymer segment as a main chain, and with a crystalline propylene polymer segment as a side chain.

Still more, according to a twelfth aspect of the present invention, in the ninth aspect, there is provided the resin composition characterized in that degree of strain hardening (λ max) of the component (M), in measurement of elongational viscosity, is 2.0 or higher.

In addition, still more, according to a thirteenth aspect of the present invention, in the ninth aspect, there is provided the resin composition characterized in that content of the component (B) is 0.2 to 10% by weight relative to total amount of the composition.

According to a fourteenth aspect of the present invention, there is provided a resin composition comprising a propylene-ethylene copolymer component (Z) in an amount of 50.0 to 99.9% by weight, and a propylene-based polymer component (M) in an amount of 0.1 to 50.0% by weight, characterized in that the propylene-ethylene copolymer component (Z) is obtained by sequential production by a multi-stage polymerization method of a crystalline propylene polymer component and a propylene-ethylene random copolymer component, and has the following (Z1) characteristics, and the propylene-based polymer component (M) is produced sequentially by a multi-stage polymerization method, comprises a component (A) insoluble in p-xylene at 25° C. and satisfying the following (A1) to (A4) characteristics, and a component (B) soluble in p-xylene at 25° C. and satisfying the following (B1) to (B2) characteristics, and also satisfies the following (M1) to (M3) characteristics:

(Z1): Amount of the component (CXS-Z) soluble in p-xylene at 25° C. in the component (Z) is 5 to 50% by weight relative to total amount of the component (Z), and amount of the component (CXIS-Z) insoluble in p-xylene at 25° C. in the component (Z) is 50 to 95% by weight relative to total amount of the component (Z), (M1): Weight average molecular weight (Mw) of the component (M), measured with GPC is 100,000 to 1,000,000, (M2): Content of component insoluble in hot p-xylene in the component (M) is 0.3% by weight or lower relative to total amount of the component (M), and (M3): Degree of strain hardening (λ max) of said component (M) in measurement of elongational viscosity is 2.0 or higher.
(A1): Amount of the component (A) is 20 to 95% by weight relative to total amount of the component (M),
(A2): Weight average molecular weight (Mw) of the component (A) measured with GPC is 100,000 to 1,000,000,
(A3): Isotactic triad fraction (mm) of the component (A), measured with $^{13}$C-NMR is 93% or more, and
(A4): Degree of strain hardening (λ max) of the component (A), in measurement of elongational viscosity is 2.0 or higher.
(B1): Amount of the component (B) is 5 to 80% by weight relative to total amount of the component (M), and
(B2): Weight average molecular weight (Mw) of the component (B), measured with GPC, is 100,000 to 1,000,000.

According to a fifteenth aspect of the present invention, in the fourteenth aspect, there is provided the resin composition characterized in that the component (B) is one containing ethylene units, and the ethylene content is 10 to 60% by weight.

In addition, according to a sixteenth aspect of the present invention, in the fourteenth aspect, there is provided the resin composition characterized in that the component (B) further (B3) the degree of strain hardening (λ max), in measurement of elongational viscosity, is 2.0 or higher.

Still more, according to a seventeenth aspect of the present invention, in the fourteenth aspect, there is provided the resin composition characterized in that content of the component (B) is 0.2 to 10% by weight, relative to total amount of the composition.

On the other hand, according to an eighteenth aspect of the present invention, there is provided a resin composition characterized by containing 0 to 70 parts by weight of ethylene/an α-olefin-based elastomer or styrene-based elastomer, and 0 to 70 parts by weight of an inorganic filler, relative to 100 parts by weight of the resin composition relevant to the ninth or fourteenth aspect.

In addition, according to a nineteenth aspect of the present invention, there is provided a method for using the propylene-based polymer according to any one of claims 1 to 6, as an impact resistance modifier of the propylene-ethylene copolymer (Z) obtained by sequential production by a multi-stage polymerization method of a crystalline propylene polymer component and a propylene-ethylene random copolymer component, using a Ziegler-Natta catalyst.

The propylene-based polymer of the present invention exerts significant effect of excellent balance of mechanical properties, as well as improved melt tension or melt fluidity, and excellent moldability and appearance. In addition, due to such excellent characteristics, it can be suitably used in injection molding, sheet molding, extrusion foam molding, large size blow molding and a modifier therefor.

In addition, according to a method for producing the propylene-based polymer of the present invention, the propylene-based polymer having the above excellent performance can be produced in high productivity and efficiently.

Still more, the resin composition of the present invention exerts significant effect that impact resistance is enhanced remarkably while maintaining rigidity at nearly the same level, and rigidity-impact resistance balance is excellent. In addition, due to such excellent characteristics, it can be suitably used in injection molding, sheet molding, extrusion foam molding, large size blow molding and the like, in particular, interior and exterior materials of a vehicle such as an automobile, or wrapping and packaging materials of electric appliances and the like.

DETAILED DESCRIPTION OF THE INVENTION

Figure 1:
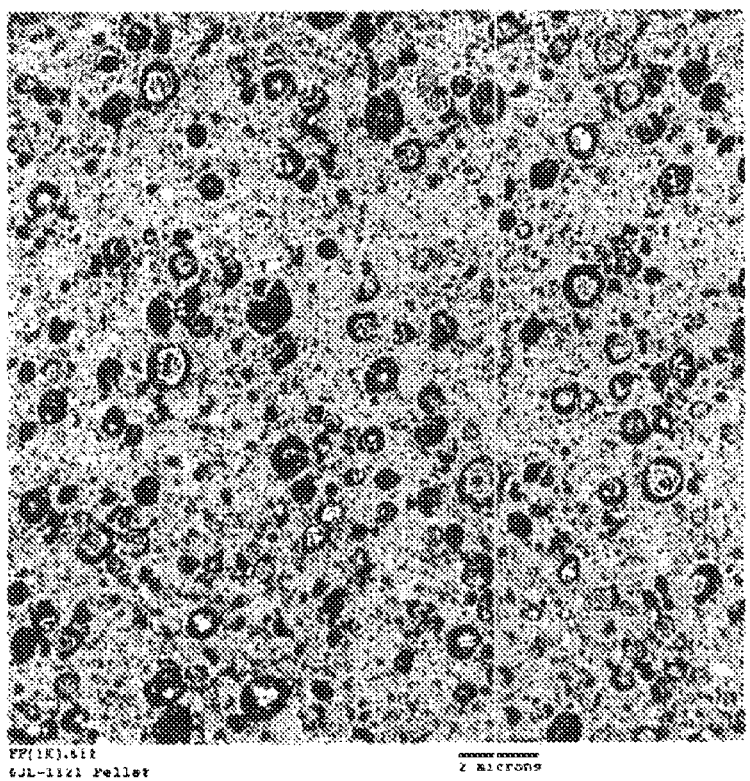
FIG. 1 is a drawing showing TEM observation result of a propylene-based polymer, in Production Example M-6 (Example) of the present invention.
Figure 1:
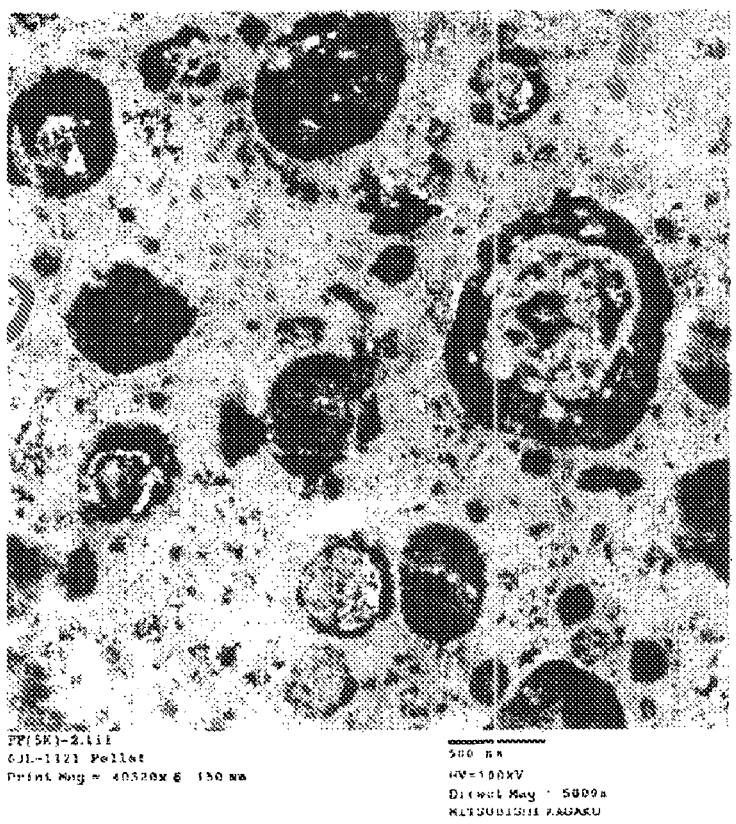

The propylene-based polymer (component (M)) of the present invention is constituted of a component (A) which becomes insoluble in p-xylene at 25° C. and a component (B) soluble in p-xylene at 25° C., and characterized in that (i) weight average molecular weight (Mw) measured with GPC is from 100,000 to 1,000,000, (ii) content of the component insoluble in hot p-xylene is 0.3% by weight or lower, and (iii) degree of strain hardening (λ max) in measurement of elongational viscosity is 2.0 or higher.

In addition, the resin composition of the present invention is constituted of a propylene-ethylene copolymer (a component (Z)) of an amount of 50.0 to 99.9% by weight, which is obtained by sequential production of a multi-stage polymerization method of a crystalline propylene polymer component and a propylene-ethylene random copolymer component, and as a modifier, a propylene-based polymer (a component (M)) in an amount of 0.1 to 50.0% by weight, which contains a structure where a part of the crystalline propylene polymer segment and the amorphous propylene copolymer segment, which are produced sequentially by a multi-stage polymerization, is chemically bonded.

Explanation will be given below sequentially by each item.

1. A Propylene-Ethylene Copolymer (a Component (Z))

The component (Z), which is a main component of the resin composition of the present invention, is a propylene-ethylene copolymer obtained by sequential production by a multi-stage polymerization method of a crystalline propylene polymer component and a propylene-ethylene random copolymer, using a conventionally known catalyst, preferably a Ziegler-Natta-based catalyst, and is called a propylene-ethylene block copolymer by those skilled in the art, however, it is understood that chemical bond is not substantially present actually, between the crystalline propylene polymer component and the propylene-ethylene random copolymer.

The component (Z) is one produced by a slurry polymerization method or a gas-phase polymerization method or a liquid phase bulk polymerization method, using a Ziegler-Natta-based highly stereoregular catalyst, however, it is preferable to be produced by a gas-phase polymerization method, in view of cost. It should be noted that as a polymerization system, any of batch polymerization and continuous polymerization may be adopted, however, production by continuous polymerization is preferable.

In producing the component (Z), it is a preferable one obtained by forming firstly a crystalline propylene homopolymer moiety by homopolymerization of propylene, and then forming an ethylene-propylene random copolymer moiety by random polymerization of propylene and ethylene, in view of quality, however, an α-olefin, excluding one having carbon atoms of three, such as ethylene or 1-butene, may be copolymerized as a comonomer within a range of several % in the first polymerization, if necessary.

A specific production method includes a method for using a titanium trichloride-based catalyst composed of titanium trichloride and organoaluminum halide; or a magnesium-supported-type catalyst, composed of solid catalyst component containing essentially magnesium chloride, titanium halide and an electron donating compound, and organoaluminum and organosilicon compounds; or a method to homopolymerize propylene, by using a combined catalyst of a solid catalyst component treated with organosilicon, formed by contacting the solid catalyst component with organoaluminum and organosilicon compounds, and an organoaluminum compound component, and then to copolymerize randomly propylene and ethylene.

In addition, this propylene-ethylene block copolymer may be a ternary or more copolymer containing other unsaturated compounds, for example, an α-olefin such as 1-butene, a vinyl ester such as vinyl acetate, an unsaturated organic acid such as maleic anhydride, or a derivative thereof, or a mixture thereof etc., within a range not to impair significantly essence of the present invention.

2. A Propylene-Based Polymer (a Component (M))

The component (M) to be used as a modifier, in the propylene-based polymer of the present invention, or the resin composition of the present invention, is a propylene-ethylene copolymer component obtained by sequential production by a multi-stage polymerization of crystalline propylene polymer component and the propylene-ethylene random copolymer component, containing a copolymer where a part of the crystalline propylene polymer segment and the amorphous propylene copolymer segment is chemically bonded.

The multi-stage polymerization is preferably a two-stage polymerization, where preferably the crystalline propylene polymer component is polymerized at the first stage, and the propylene-ethylene random copolymer component is polymerized at the second stage.

In this case, by existing the crystalline propylene polymer produced at the first stage, a much part of which has a terminal vinyl group in its state resulting from terminal reaction, it contributes to polymerization at the second stage, as a macromer, when polymerization at the second stage is executed as it is, which generates a copolymer, having a branched structure with an amorphous propylene copolymer segment (a propylene-ethylene random copolymer segment) as a main chain, and with a crystalline propylene polymer segment as a side chain.

The present inventors consider that a factor for the resin composition of the present invention to fulfill good impact resistance can be attributed to presence of this copolymer having a branched structure. In general, it has been known that a polymer having a moiety composed of a chain of different monomer sequence in a molecule, such as a real block copolymer or a graft copolymer, takes a phase separated structure in an order of a molecular level far smaller than a usual phase separated structure, called a micro phase separated structure, and such a fine phase separated structure enhances impact resistance remarkably. Actually, in an electron microscope photographs (FIGS. 1 and 2) of the component (M) (a copolymer having a branched structure) relevant to the present invention, a dispersed structure of an extremely fine elastomer domain is observed, as compared with a usual resin (without presence of a branched structure (FIG. 3)), supporting the above inference.

It should be noted that the component (M) contains a copolymer having a branched structure with the amorphous propylene copolymer segment (the propylene-ethylene random copolymer segment) as a main chain, and with the crystalline propylene polymer segment as a side chain. The component constituting the main chain may contain, other than propylene and ethylene, other unsaturated compounds, for example, an α-olefin such as 1-butene, within a range not to impair significantly essence of the present invention. The component constituting the side chain is mainly propylene, and may contain, a small amount of other unsaturated compounds, for example, an α-olefin such as 1-butene, within a range not to impair significantly essence of the present invention.

As a method for judging whether a copolymer having a branched structure with the propylene-ethylene random copolymer segment as a main chain, and with the crystalline propylene polymer segment as a side chain, as described above, is present or not, use of the degree of strain hardening ($\lambda$ max) obtained by measurement of elongational viscosity, is effective.

The above degree of strain hardening ($\lambda$ max) is an index representing melt strength, and the larger value provides enhancing effect of melt tension.

In addition, this degree of strain hardening is an index representing non-linearity of elongational viscosity, and usually it is said that the more molecular entanglement increases this value. The molecular entanglement receives influence of amount of branching and length of the branched chain. Therefore, the more amount of branching and the longer length of the branch increase the degree of strain hardening.

In the component (M) of the present invention, in producing the crystalline propylene polymer at the first stage, the propylene polymer having a terminal vinyl group contributes to polymerization as a macromer, to generate a branched propylene polymer. Therefore, this degree of strain hardening is an index of generation amount of the propylene polymer having a terminal vinyl group, and preferably 2.0 or higher.

Here, as for a measurement method for the degree of strain hardening, any method provides the same value principally, as long as it is a method of measuring mono-axial elongational viscosity, and for example, details of the measurement method and the measuring apparatus are described in known literature, Polymer 42, (2001), 8663, among them the preferable measurement method and the measuring apparatus may be follows:

A Measurement Method 1:
Apparatus: Ares, manufactured by Rheometrics Co., Ltd.
Tool: Elongational viscosity Fixture, manufactured by T. A. Instruments Co., Ltd.
Measurement temperature: 180° C.
Strain rate: 0.1/sec
Preparation of a test piece: A sheet with a size of 18 mm×10 mm and a thickness of 0.7 mm is prepared by press molding.

A Measurement Method 2:
Apparatus: Melten Rheometer, manufactured by Toyo Seiki Co., Ltd.
Measurement temperature: 180° C.
Strain rate: 0.1/sec
Preparation of a test piece: An extrusion strand is prepared in a rate of 10 to 50 mm/min, by using an orifice with an inner diameter of 3 mm, at 180° C., by using "Capillograph", manufactured by Toyo Seiki Co., Ltd.

A Calculation Method:

Elongational viscosity, when strain rate is 0.1/sec, is plotted on a double logarithmic graph, taking time t (sec) as abscissa axis, and elongational viscosity, ηE (Pa·sec), as ordinate axis. On this double logarithmic graph, by drawing the straight line just before generating strain hardening, η lin is determined as the extrapolated value at the time when the measured elongational viscosity ηE reaches maximum (η max) within the strain amount 4.0.

Figure 5:
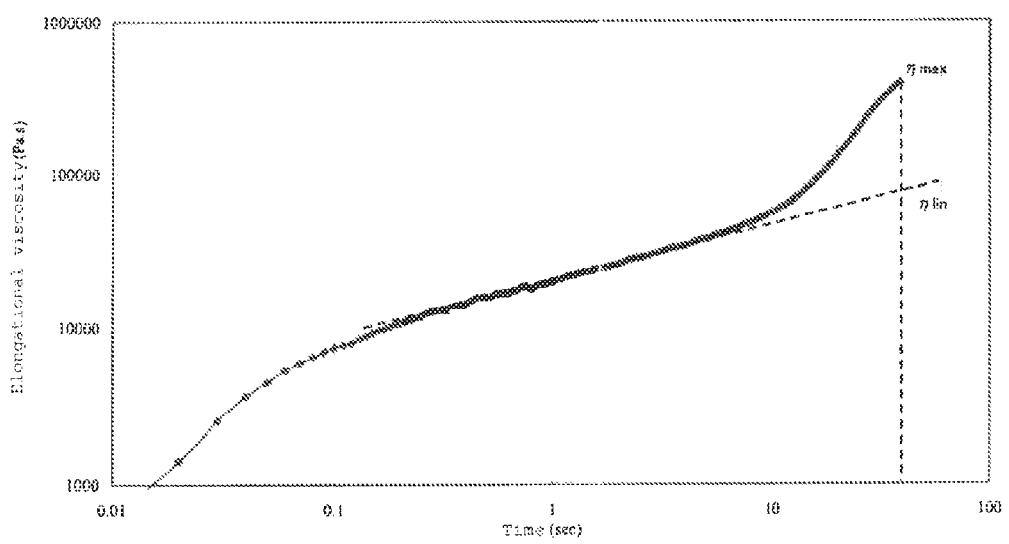
FIG. 5 is a plot diagram showing an example of elongational viscosity measured with a mono-axial elongational viscosity meter.

FIG. 5 is an example of a plot chart of elongational viscosity. Value of η max/η lin is defined as λ0 max, and used as an index of the degree of strain hardening.

Elongational viscosity or the degree of strain hardening calculated by the measurement method 1 and the measurement method 2 show the same values, because of measuring, in principle, elongational viscosity and the degree of strain hardening intrinsic to a substance. Therefore, they may be measured by any method of the measurement method 1 or the measurement method 2.

However, the measurement method 2 has restriction in measurement that measurement precision lowers in measuring a sample with relatively low molecular weight (that is, when MFR>2), due to sagging of a measurement sample, and also the measurement method 1 has a problem of measurement precision that the degree of strain hardening is estimated smaller, in measuring a sample with relatively high molecular weight (that is, when MFR<1), due to inhomogeneous shrinkage-deformation of a measurement sample, resulting in strain unevenness in measurement, and strain hardening is averaged with a linear part.

Therefore it is preferable in view of convenience that the measurement method 1 is used for a sample with low molecular weight, and the measurement method 2 is used for a sample with high molecular weight.

In general, to exhibit the high degree of strain hardening, the length of the branch is preferably 7000, which is approximate to the entanglement molecular weight (Me) of polypropylene, or higher, and it is said that the longer branch provides the larger degree of strain hardening.

The resin composition of the present invention is a composition constituted of the above component (Z) and the component (M), having such characteristics, and composition range of each component is as follows.

Amount ratio of the crystalline propylene polymer component and the propylene-ethylene random copolymer component (amorphous component) of the component (Z) may be determined also by material balance etc. in polymerization, however, it can be determined analytically by fractionation of the crystalline component and the amorphous component with p-xylene, as shown below.

It is required that, in the component (Z), amount of the component (CXS-Z) soluble in p-xylene at 25° C., that is, amount of the propylene-ethylene random copolymer component, is 5 to 50% by weight, and amount of the component (CXIS-Z) insoluble in p-xylene, that is, amount of the crystalline propylene polymer component, is 50 to 95% by weight relative to total amount of the component (Z)), in view of rigidity-impact resistance balance.

In addition, similarly, there is used such one that has amount of the component (B) soluble in p-xylene at 25° C. is 5 to 80% by weight relative to total amount of (M), and amount of the component (A) insoluble in p-xylene at 25° C. is 20 to 95% by weight relative to total amount of (M), determined by fractionation of the component (M) to the crystalline component and the amorphous component.

In addition, it is preferable, in view of rigidity-impact resistance balance of the composition, that the component (Z) and the component (M) are formulated in weight ratio to achieve weight of the component (B) to be 0.2 to 10% by weight relative to total composition.

Here, a specific fractionation method of the crystalline component and the amorphous component is as described below.

A Fractionation Method:

2 g of a sample is dissolved into 300 ml of p-xylene (containing 0.5 mg/mL of BHT: 2,6-di-tert-butyl-4-methylphenol) at 130° C., to make a solution, and then left it to stand at 25° C. for 48 hours. Then, the solution is separated by filtration to a deposited polymer and a filtrate. From the filtrate, p-xylene is evaporated, and still more dried under reduced pressure at 100° C. for 12 hours to recover a component soluble to xylene at 25° C. (CXS). In addition, from the deposited polymer, residual p-xylene is sufficiently removed similarly to obtain a component insoluble to xylene at 25° C. (CIXS).

The above component (Z) is preferably one having melt flow rate (at 230° C. under a load of 2.16 kg) in a range of 15 to 200 g/10 min. One outside this range is difficult to use in an injection molding field, which is a major application of impact resistant polypropylene.

In addition, one having ethylene content (value to the propylene-ethylene random copolymer) in the propylene-ethylene random copolymer component in the component (Z), in a range of 10 to 70% by weight, is preferably used, in view of enhancement of impact resistance at low temperature.

As described above, the component (M) is constituted of the component (A) which becomes insoluble to xylene at 25° C., and the component (B) soluble to xylene at 25° C., and a part of each component contains a copolymer, which has a branched structure, with a propylene-ethylene random copolymer segment as a main chain and with a crystalline propylene polymer segment as a side chain, therefore it is characterized analytically by having the following characteristics (M1) to (M3), (A1) to (A4) and (B1) to (B2).

(M1): Weight average molecular weight (Mw) of the component (M), measured with GPC, is 100,000 to 1,000,000, (M2): Content of component insoluble in hot p-xylene, in the component (M), is 0.3% by weight or lower relative to total amount of the component (M) and (M3): Degree of strain hardening (λ max) of the component (M), in measurement of elongational viscosity, is 2.0 or higher, (A1): Amount of the component (A) is 20 to 95% by weight relative to total amount of the component (M), (A2): Weight average molecular weight (Mw) of the component (A), measured with GPC, is 100,000 to 1,000,000, (A3): Isotactic triad fraction (mm) of the component (A), measured with $^{13}$C-NMR, is 93% or more, and (A4): Degree of strain hardening (λ max) of the component (A), in measurement of elongational viscosity, is 2.0 or higher, (B1): Amount of the component (B) is 5 to 80% by weight relative to total amount of the component (M), and (B2): Weight average molecular weight (Mw) of the component (B), measured with GPC, is 100,000 to 1,000,000.

Explanation will be given below sequentially by each item.

(M1): Weight average molecular weight (Mw) of the component (M) measured with GPC is 100,000 to 1,000,000.

As the component (M), one having weight average molecular weight (Mw) in a range of 100,000 to 1,000,000 is used.

The weight average molecular weight (Mw) is one measured with a GPC apparatus and under conditions to be described later, and Mw of the component (M) is necessary to be in a range of 100,000 to 1,000,000. This Mw of smaller than 100,000 provides inferior melt moldability and insufficient mechanical strength, on the other hand, the Mw of over 1,000,000 increases melt viscosity and decreases melt moldability. The Mw is in the above range, in view of balance between melt moldability and mechanical strength, preferably Mw is in a range of 150,000 to 900,000, and still more preferably in a range of 200,000 to 800,000.

Value of the weight average molecular weight (Mw) is obtained with gel permeation chromatography (GPC), and details of measurement method and measurement apparatus thereof is as follows.

Figure 4:
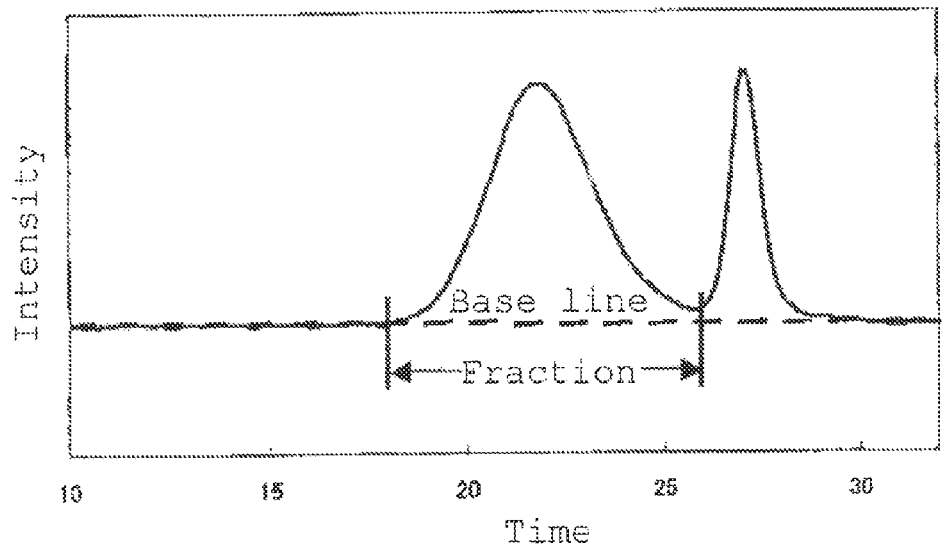
FIG. 4 is a drawing explaining a base line and a fraction of a chromatogram in GPC.

Apparatus: GPC, manufactured by Waters Co., Ltd. (ALC/GPC, 150)
Detector: MIRAN, 1A, an IR detector (measurement wavelength: 3.42 μm), manufactured by FOXBORO Co., Ltd.
Column: AD806M/S (three sets), manufactured by Showa Denko K.K.
Moving phase solvent: O-dichlorobenzene (ODCB)
Measurement temperature: 140° C.
Flow rate: 1.0 ml/min.
Charge amount: 0.2 ml A sample is prepared by dissolving a sample into ODCB (containing 0.5 mg/ml of BHT) to make a 1 mg/mL solution, at 140° C. over about 1 hour. It should be noted that a base line and a fraction of the obtained chromatogram are carried out as shown in FIG. 4. In addition, retention volume obtained by GPC measurement is converted to molecular weight by using a calibration curve prepared in advance with standard polystyrene samples. All of the standard polystyrene samples used are the following grades, manufactured by Tosoh Corp.
Grades: F380, F288, F128, F80, F40, F20, F10, F4, F1, A5000, A2500 and A1000

Each of the grades is dissolved into ODCB (containing 0.5 mg/ml of BHT) to achieve 0.5 mg/mL, and 0.2 mL of the solution is charged to prepare the calibration curve. The calibration curve is cubic polynomial function obtained by a least square method. Intrinsic viscosity equation used in conversion to molecular weight, $[\eta]=K \times M^{\alpha}$, the following values are used
PS: $K=1.38 \times 10^{-4}$, $\alpha=0.7$
PP: $K=1.03 \times 10^{-4}$, $\alpha=0.78$ (M2): Content of component insoluble in hot p-xylene in the component (M) is 0.3% by weight or lower relative to total amount of the component (M).

In the present invention, it is necessary that content of component insoluble in hot p-xylene is 0.3% by weight or lower. A method for measuring the component insoluble in hot p-xylene is as described below.

Into a cage prepared by 400 mesh (wire diameter: 0.03 μm, mesh opening: 0.034 mm, void: 27.8%) stainless steel, in a separable glass flask equipped with a stirring apparatus, 500 mg of a polymer is charged and the cage is fixed at a stirring blade. 700 mL of p-xylene containing 1 g of an antioxidant (BHT: 2,6-di-tert-butyl-4-methylphenol) is charged to dissolve the polymer under stirring at 140° C. for 2 hours.

By recovering the cage containing a portion insoluble in p-xylene, and weighing after sufficient drying, the portion insoluble in p-xylene was determined. Gel fraction (% by weight) defined by the portion insoluble in p-xylene was calculated by the following equation:

Gel fraction=[(residual weight in the mesh, g)/(weight of the sample charged, g)]×100

In addition, to achieve less gel, or no gel as described above, it is important that a component with very high molecular weight is absent. Therefore, when molecular weight distribution is measured with GPC, it is important that the molecular weight distribution is not spread toward a high molecular weight side.

Accordingly, Q value (ratio of weight average molecular weight (Mw) to number average molecular weight (Mn)) measured with GPC is preferably 7 or smaller, more preferably 6 or smaller and still more preferably 5 or smaller.

In addition, to achieve no extreme spread of the molecular weight distribution to a high molecular weight side, it is necessary that molecular weight M(90), giving integration value of 90% in a GPC curve, is 2,000,000 or smaller.

Here, M(90) is molecular weight, giving integration value of 90% in a GPC curve, measured with the GPC measurement apparatus and under the condition described above, and the present invention is characterized by M(90) being 2,000,000 or smaller. This M(90) of over 2,000,000 excessively increases the high molecular weight component, resulting in gel generation or decreased melt moldability. Therefore, M(90) is 2,000,000 or smaller, preferably 1,500,000 or smaller, and more preferably 1,000,000 or smaller.

(M3): Degree of strain hardening (λ max) of the component (M), in measurement of elongational viscosity, is 2.0 or higher.

Physical significance of the degree of strain hardening is as described above, and the larger value generates the less uneven thickness, for example, in blow molding, and enables the higher independent bubbles in foaming. Therefore, this degree of strain hardening is necessary to be 2.0 or larger, preferably 3.0 or larger, and more preferably 4.0 or larger.

Length of the branch is preferably 7,000 or higher, as entanglement molecular weight of polypropylene. This molecular weight is different, in the strict sense, from weight average molecular weight (Mw) measured with GPC. Accordingly, value of weight average molecular weight (Mw) measured with GPC is preferably 15,000 or higher, and more preferably 30,000 or higher.

(1) A Component (A)

(A1): Amount of the component (A) is 20 to 95% by weight relative to total amount of the component (M).

This specification is a range relative to total weight of (M) of the component (A), and this range is used in view of rigidity-impact resistance balance.

(A2): Weight average molecular weight (Mw) of the component (A), measured with GPC, is 100,000 to 1,000,000.

Here, weight average molecular weight (Mw) is one measured with a GPC measurement apparatus and under condition described above, and the component (A) having weight average molecular weight (Mw) in a range of 100,000 to 1,000,000 is used.

The weight average molecular weight (Mw) of smaller than 100,000 provides inferior melt moldability, as well as insufficient mechanical strength, on the other hand, the weight average molecular weight (Mw) of over 1,000,000 increases melt viscosity and decreases melt moldability. The weight average molecular weight (Mw) is in the above range, preferably in a range of 150,000 to 900,000, and more preferably 200,000 to 800,000, in view of balance of melt moldability and mechanical strength.

(A3): Isotactic triad fraction (mm) of the component (A), measured with $^{13}$C-NMR, is 93% or more.

The mm fraction is ratio of the triad of propylene units, having the same methyl branch direction in each propylene unit, in arbitrary three chains of propylene units constituted of head-tail bonding, in a polymer chain. This mm fraction is a value showing that a stereo structure of a methyl group in a polypropylene molecular chain is controlled in an isotactic state, and the higher value means the high degree of control.

When mm fraction of the component (A) is smaller than this value, mechanical properties decrease, for example, modulus of a product decreases. Therefore, the mm fraction is preferably 95% or higher, and more preferably 96% or higher.

Details of a measurement method for mm fraction of the triad of propylene units with $^{13}$C-NMR are as follows.

In an NMR sample tube (10 φ), 375 mg of a sample is completely dissolved into 2.5 mL of deuterated 1,1,2,2-tetrachloroethane, and then mm fraction was measured at 125° C. by a proton complete decoupling method. As for chemical shift, the center peak among three peaks of deuterated 1,1,2,2-tetrachloroethane was set to be 74.2 ppm. Chemical shifts of other carbon peaks are based on this value.

Flip angle: 90 degree
Pulse interval: 10 sec.
Resonance frequency: 100 MHz or higher
Integration times: 10,000 times or more
Observation region: −20 ppm to 179 ppm Measurement of the mm fraction is executed using $^{13}$C-NMR spectra measured under the above conditions.

Assignment of the spectra is executed with reference to Macromolecules, (1975), vol. 8, 687 p, or Polymer, vol. 30, 1350 p (1989), and specifically according to a method described in detail in JP Application No. 2006-311249.

(A4): Degree of strain hardening (λ max) of the component (A) in measurement of elongational viscosity is 2.0 or higher.

Physical significance of the degree of strain hardening is as described above, and the larger value generates the less uneven thickness, for example, in blow molding, and enables the higher independent bubbles in foaming. Therefore, this degree of strain hardening is necessary to be 2.0 or larger, preferably 3.0 or larger, and more preferably 4.0 or larger.

Length of the branch is preferably 7,000 or higher, as entanglement molecular weight of polypropylene. This molecular weight is different, in the strict sense, from weight average molecular weight (Mw) measured with GPC. Accordingly, value of weight average molecular weight (Mw) measured with GPC is preferably 15,000 or higher, and more preferably 30,000 or higher.

In addition, in the present invention, by having a branched-type structure having a crystalline segment in both a side chain and a main chain, as well as a branched-type structure having a crystalline segment in a side chain and an amorphous segment in a main chain, higher degree of strain hardening is shown.

A measurement method for elongational viscosity, and a determination method for λ max are as described above.

In addition, the propylene-based polymer of the present invention satisfies (A5), other than the above (A1) to (A4).

(A5): A propylene unit and an ethylene unit or an α-olefin unit are contained.

A unit constituting the component (A) is required to have crystallinity by isotactic arrangement of propylene. In addition, ethylene or an α-olefin may be contained as a comonomer unit within a range that crystallinity is expressed. Presence of an α, ω-diene unit could provide gel by cross-linking, therefore, it is necessary that the α, ω-diene unit is not contained.

Kind of the comonomer is preferably ethylene or a straight chain α-olefin, and more preferably ethylene.

Content of the comonomer may be arbitrary amount within a range that crystallinity is expressed.

Melting point (Tm) measured with DSC, which is an index of crystallinity, is 120° C. or higher, preferably 150° C. or higher, and still more preferably 153° C. or higher. The melting point (Tm) of 150 to 164° C. provides excellent heat resistance and rigidity, making possible use to industrial parts or members, while the melting point (Tm) of 120 to 150° C. provides excellent transparency and flexibility, making possible use to films or containers.

In addition, content of ethylene of the component (A) is preferably 0.1 to 10% by weight, more preferably 0.2 to 7% by weight, and still more preferably 0.3 to 5% by weight.

Measurement of the ethylene unit is executed using $^{13}$C-NMR, according to a method described in Macromolecules, 1982, 1150.

(2) A Component (B)

(B1): Amount of the component (B) is 5 to 80% by weight, relative to total amount of the component (M).

This specification is a range relative to total weight of (M) of the component (B), and one having this range is used in view of rigidity-impact resistance balance.

(B2): Weight average molecular weight (Mw) of the component (B), measured with GPC, is 100,000 to 1,000,000.

Here, weight average molecular weight (Mw) is one measured with a GPC measurement apparatus and under condition described above, and the component (B) having weight average molecular weight (Mw) in a range of 100,000 to 1,000,000 is used. The Mw of smaller than 100,000 provides inferior melt moldability, as well as insufficient mechanical strength, on the other hand, the Mw of over 1,000,000 increases melt viscosity and decreases melt moldability. The weight average molecular weight (Mw) is in the above range, preferably in a range of 150,000 to 900,000, and more preferably 200,000 to 800,000, in view of balance of melt moldability and mechanical strength.

Explanation will be given below on the following (B3) as condition of the component (B).

(B3): Degree of strain hardening (λ max) in measurement of elongational viscosity of the component (B) is usually 1 to 20.

The degree of strain hardening is an index representing non-linearity of elongational viscosity, and usually it is said that the more molecular entanglement increases this value. The molecular entanglement receives influence of amount of branching and length of the branched chain. Therefore, the more amount of branching and the longer length of the branch increase the degree of strain hardening.

Physical significance of the degree of strain hardening is as described above, and the larger value generates the less uneven thickness, for example, in blow molding, and enables the higher independent bubbles in foaming. Therefore, this degree of strain hardening is necessary to be 2.0 or larger, in application to blow molding or foaming.

In addition, on the contrary, small degree of strain hardening suppresses generation of weld in molded articles and does not impair appearance, for example, in injection molding. Therefore, the degree of strain hardening is preferably below 2.0, for use in injection molding.

A measurement method for elongational viscosity, and a determination method for λ max are as described above.

In addition, the propylene-based polymer of the present invention satisfies the following (B4), other than the above (B1) to (B3).

(B4): A propylene unit and an ethylene unit and/or an α-olefin unit are contained.

As a unit constituting the component (B), it is necessary that propylene and ethylene or an α-olefin are copolymerized. In addition, presence of an α, ω-diene unit could provide gel by cross-linking, therefore, it is preferable that the α, ω-diene unit is not contained.

In addition, kind of the comonomer is preferably ethylene or a straight chain α-olefin, and more preferably ethylene, and usually content of ethylene is preferably 10% by weight or higher and 60% by weight or lower, and one having the content of 40% by weight or higher and 60% by weight or lower is preferably used, in view of enhancement of impact resistance at low temperature. In addition, one having the content of 10% by weight or higher and below 40% by weight is preferably used, in view of gloss and transparency.

Measurement of the ethylene unit is executed using $^{13}$C-NMR, according to a method described in Macromolecules, 1982, 1150.

3. A Method for Producing the Propylene-Based Polymer (the Component (M))

A method for producing the propylene-based polymer of the present invention, or a method for producing the component (M) relevant to the present invention is not especially limited, as long as it is a method for obtaining the propylene-based polymer satisfying the above (i) weight average molecular weight (Mw) measured with GPC is from 100,000 to 1,000,000, (ii) content of the component insoluble in hot p-xylene is 0.3% by weight or lower, and (iii) the degree of strain hardening (λ max) in measurement of elongational viscosity is 2.0 or higher, as well as it is constituted of the component (A) of (A1) to (A5) and the component (B) of (B1) to (B4), however, it is preferable to execute a sequential production method, and an order thereof is that preferably, a crystalline propylene-based macromer is produced first, and then an amorphous olefin copolymer is produced sequentially. By polymerization in such an order, a copolymer having a branched structure, with a crystalline segment as a side chain, and with an amorphous segment as a main chain, can be produced efficiently.

In addition, as for a production method therefor, catalyst components used are not especially limited, however, the propylene-based polymer of the present invention, or the propylene-ethylene copolymer (the component (M)) relevant to the present invention can be produced in good productivity by using the following catalyst components (a), (b) and (c), and (i) a first step for polymerizing propylene only, or propylene and ethylene and/or an α-olefin, where ethylene, the α-olefin or total amount of ethylene and the α-olefin is polymerized in an amount of 0 to 10% by weight relative to total monomer components; and (ii) a second step for polymerizing propylene and ethylene and/or the α-olefin, where ethylene, the α-olefin or total amount of ethylene and the α-olefin is polymerized in an amount of 10 to 90% by weight relative to total monomer components.

(1) A Component (a):

The catalyst component (a) used in the present invention is a metallocene compound, having hafnium as a center metal, represented by the general formula (1).

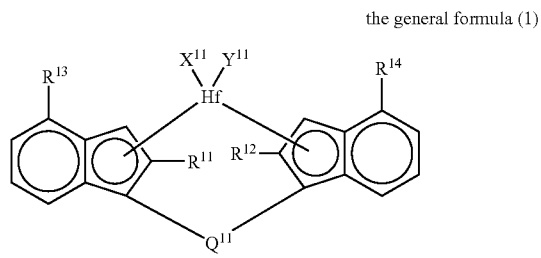

the general formula (1)

[in the general formula (1), each of $R^{11}$ and $R^{12}$ represents independently an alkyl group having carbon atoms of 1 to 6, an aryl group having carbon atoms of 6 to 16, an aryl group containing a halogen and having carbon atoms of 6 to 16, a hetero cyclic group containing nitrogen, oxygen or sulfur and having carbon atoms of 4 to 16, and at least one of $R^{11}$ and $R^{12}$ represents a hetero cyclic group containing nitrogen, oxygen or sulfur and having carbon atoms of 4 to 16. In addition, each of $R^{13}$ and $R^{14}$ represents independently, an alkyl group containing a halogen and having carbon atoms of 1 to 6, an aryl group having carbon atoms of 6 to 16, an aryl group containing a halogen and having carbon atoms of 6 to 16, an aryl group containing silicon and having carbon atoms of 6 to 16, and a hetero cyclic group containing nitrogen, oxygen or sulfur and having carbon atoms of 6 to 16. Still more, $X^{11}$ and $Y^{11}$ each independently represent a hydrogen atom, a halogen atom, a hydrocarbon group having carbon atoms of 1 to 20, a hydrocarbon group containing silicon and having carbon atoms of 1 to 20, a halogenated hydrocarbon group having carbon atoms of 1 to 20, a hydrocarbon group containing oxygen and having carbon atoms of 1 to 20, an amino group, or a hydrocarbon group containing nitrogen and having carbon atoms of 1 to 20; and $Q^{11}$ represents a bivalent hydrocarbon group having carbon atoms of 1 to 20, a silylene group or a germylene group which may contain a hydrocarbon group having carbon atoms of 1 to 20]

A hetero cyclic group containing nitrogen, oxygen or sulfur and having carbon atoms of 4 to 6, represented by the above $R^{11}$ and $R^{12}$, includes preferably a 2-furyl group, a substituted a 2-furyl group, a substituted 2-thienyl group, a substituted 2-furfuryl group, and still more preferably a substituted a 2-furyl group.

In addition, as a substituted group in the substituted 2-furyl group, the substituted 2-thienyl group or the substituted 2-furfuryl group, there is included an alky group having carbon atoms of 1 to 6 such as a methyl group, an ethyl group, a propyl group; a halogen atom such as a fluorine atom, a chlorine atom; an alkoxy group having carbon atoms of 1 to 6 such as a methoxy group, an ethoxy group; and a trialkylsilyl group. Among them, a methyl group and a trialkylsilyl group are preferable, and a methyl group is particularly preferable.

Still more, as $R^{11}$ and $R^{12}$, a 2-(5-methyl)-furyl group is particularly preferable. In addition, $R^{11}$ and $R^{12}$ are preferably the same each other.

As the above $R^{13}$ and $R^{14}$, an alkyl group containing a halogen and having carbon atoms of 1 to 6, an aryl group having carbon atoms of 6 to 16, an aryl group containing a halogen and having carbon atoms of 6 to 16, and an aryl group containing silicon, and having carbon atoms of 6 to 16 are preferable, and such an aryl group may have, as substituents, one or more of a hydrocarbon group having carbon atoms of 1 to 6, a hydrocarbon group containing silicon and having carbon atoms of 1 to 6, a hydrocarbon group containing a halogen and having carbon atoms of 1 to 6, on an aryl-ring skeleton, within a range of total carbon atoms of 6 to 16.

As the $R^{13}$ and $R^{14}$, preferably at least one is a phenyl group, a 4-t-butylphenyl group, a 2,3-dimethylphenyl group, a 3,5-di-t-butylphenyl group, a 4-phenyl-phenyl group, a chlorophenyl group, a naphthyl group, or a phenanthryl group, and still more preferably a phenyl group, a 4-t-butylphenyl group, or a 4-chlorophenyl group. In addition, it is preferable that $R^{13}$ and $R^{14}$ are the same each other.

In the general formula (1), $X^{11}$ and $Y^{11}$ each independently represent a hydrogen atom, a halogen atom, a hydrocarbon group having carbon atoms of 1 to 20, a halogenated hydrocarbon group having carbon atoms of 1 to 20, a hydrocarbon group containing silicon and having carbon atoms of 1 to 20, a hydrocarbon group containing oxygen and having carbon atoms of 1 to 20, a hydrocarbon group containing an amino group or nitrogen and having carbon atoms of 1 to 20. The above halogen atom includes a fluorine atom, a chlorine atom, a bromine atom, an iodine atom.

As a specific example of the above hydrocarbon group having carbon atoms of 1 to 20, there is included an alkyl group such as methyl, ethyl, n-propyl, i-propyl, n-butyl, i-butyl, s-butyl; an alkenyl group such as vinyl, propenyl, cyclohexenyl; an arylalkyl group such as benzyl; an arylalkenyl group such as trans-styryl; an aryl group such as phenyl, tolyl, 1-naphthyl, 2-naphthyl.

As a specific example of the above hydrocarbon group containing oxygen and having carbon atoms of 1 to 20, there is included an alkoxy group such as methoxy, ethoxy, propoxy, butoxy; an aryloxy group such as phenoxy, naphthoxy; an arylalkoxy group such as phenylmethoxy; a hetero cyclic group containing oxygen, such as a furyl group.

As a specific example of the above hydrocarbon group containing nitrogen, and having carbon atoms of 1 to 20, there is included an alkylamino group such as methylamino, dimethylamino, ethylamino, diethylamino or; an arylamino group such as phenylamino, diphenylamino; an (alkyl) (aryl)) amino group such as (methyl) (phenyl)) amino; a hetero cyclic group containing nitrogen, such as pyrazolyl, indolyl.

In the above hydrocarbon halide group having carbon atoms of 1 to 20, a halogen atom includes a fluorine atom, a chlorine atom, a bromine atom and an iodine atom. In addition, the hydrocarbon halide group is, when the halogen atom is, for example, a fluorine atom, a compound substituted with the fluorine atom at an arbitrary site of the hydrocarbon group. Specifically, fluoromethyl, difluoromethyl, trifluoromethyl, chloromethyl, dichloromethyl, trichloromethyl group etc. is included.

As a specific example of the above hydrocarbon group containing silicon and having carbon atoms of 1 to 20, there included a trialkylsilylmethyl group such as trimethylsilylmethyl, triethylsilylmethyl; a di(alkyl)(aryl)silylmethyl group such as dimethylphenylsilylmethyl, diethylphenylsilylmethyl, dimethyltolylsilylmethyl.

In the general formula (1), $Q^{11}$ represents any of a bivalent hydrocarbon group having carbon atoms of 1 to 20, and a silylene group and a germylene group, which may have a hydrocarbon group having carbon atoms of 1 to 20, for binding two five-member rings. When two hydrocarbon groups are present on the silylene group and the germylene group, they may form a ring structure by bonding each other.

As a specific example of the above $Q^{11}$, there may be included an alkylene group such as methylene, methylmethylene, dimethylmethylene, 1,2-ethylene; an arylalkylene group such as diphenylmethylene; a silylene group; an alkylsilylene group such as methylsilylene, dimethylsilylene, diethylsilylene, di(n-propyl)silylene, di(i-propyl)silylene, di(cyclohexyl)silylene; an (alkyl) (aryl)silylene group such as methyl(phenyl)silylene; an arylsilylene group such as diphenylsilylene; an alkyloligosilylene group such as tetramethyldisilylene; a germylene group; an alkylgermylene group; an (alkyl)(aryl)germylene group; an arylgermylene group or the like. Among them, a silylene group a hydrocarbon group having carbon atoms of 1 to 20, or a germylene group having a hydrocarbon group having carbon atoms of 1 to 20 is preferable, and an alkylsilylene group and an alkylgermylene group are particularly preferable.

A preferable compound, among compounds represented by the above general formula (1), will be exemplified specifically below:

dichloro[1,1'-dimethylsilylenebis{2-(2-furyl)-4-phenyl-indenyl}]hafnium, dichloro[1,1'-dimethylsilylenebis{2-(2-thienyl)-4-phenyl-indenyl}]hafnium, dichloro[1,1'-dimethylsilylenebis{2-(5-methyl-2-furyl)-4-phenyl-indenyl}] hafnium, dichloro[1,1'-diphenylsilylenebis{2-(5-methyl-2-furyl)-4-phenyl-indenyl}]hafnium, dichloro[1,1'-diphenylgermylenebis{2-(5-methyl-2-furyl)-4-phenyl-indenyl}]hafnium, dichloro[1,1'-diphenylgermylenebis{2-(5-methyl-2-thienyl)-4-phenyl-indenyl}]hafnium, dichloro[1,1'-dimethylsilylenebis{2-(5-t-butyl-2-furyl)-4-phenyl-indenyl}]hafnium, dichloro[1,1'-dimethylsilylenebis{2-(5-trimethylsilyl-2-furyl)-4-phenyl-indenyl}]hafnium, dichloro[1,1'-dimethylsilylenebis{2-(5-phenyl-2-furyl)-4-phenyl-indenyl}]hafnium, dichloro[1,1'-dimethylsilylenebis{2-(4,5-dimethyl-2-furyl)-4-phenyl-indenyl}]hafnium, dichloro[1,1'-dimethylsilylenebis{2-(2-benzofuryl)-4-phenyl-indenyl}]hafnium, dichloro[1,1'-dimethylsilylenebis{2-(5-methyl-2-furyl)-4-methyl-4-indenyl}] hafnium, dichloro[1,1'-dimethylsilylenebis{2-(5-methyl-2-furyl)-4-isopropyl-indenyl}]hafnium, dichloro[1,1'-dimethylsilylenebis{2-(2-furfuryl)-4-phenyl-indenyl}] hafnium, dichloro[1,1'-dimethysilylenebis{2-(5-methyl-2-furyl)-4-(4-chlorophenyl)-indenyl}]hafnium, dichloro[1,1'-dimethysilylenebis{2-(5-methyl-2-furyl)-4-(4-fluorophenyl)-indenyl}]hafnium, dichloro[1,1'-dimethysilylenebis{2-(5-methyl-2-furyl)-4-(4-trifluoromethylphenyl)-indenyl}]hafnium, dichloro[1,1'-dimethysilylenebis{2-(5-methyl-2-furyl)-4-(4-t-butylphenyl)-indenyl}]hafnium, dichloro[1,1'-dimethysilylenebis{2-(2-furyl)-4-(1-naphthyl)-indenyl}] hafnium, dichloro[1,1'-dimethysilylenebis{2-(2-furyl)-4-(2-naphthyl)-indenyl}]hafnium, dichloro[1,1'-dimethysilylenebis{2-(2-furyl)-4-(2-phenanthryl)-indenyl}]hafnium, dichloro[1,1'-dimethysilylenebis{2-(2-furyl)-4-(9-phenanthryl)-indenyl}]hafnium, dichloro[1,1'-dimethysilylenebis{2-(5-methyl-2-furyl)-4-(1-naphthyl)-indenyl}]hafnium, dichloro[1,1'-dimethysilylenebis{2-(5-methyl-2-furyl)-4-(2-naphthyl)-indenyl}]hafnium, dichloro[1,1'-dimethysilylenebis{2-(5-methyl-2-furyl)-4-(2-phenanthryl)-indenyl}]hafnium, dichloro[1,1'-dimethysilylenebis{2-(5-methyl-2-furyl)-4-(9-phenanthryl)-indenyl}]hafnium, dichloro[1,1'-dimethysilylenebis{2-(5-t-butyl-2-furyl)-4-(1-naphthyl)-indenyl}]hafnium, dichloro[1,1'-dimethysilylenebis{2-(5-t-butyl-2-furyl)-4-(2-naphthyl)-indenyl}]hafnium, dichloro[1,1'-dimethysilylenebis{2-(5-t-butyl-2-furyl)-4-(2-phenanthryl)-indenyl}]hafnium, dichloro[1,1'-dimethysilylenebis{2-(5-t-butyl-2-furyl)-4-(9-phenanthryl)-indenyl}]hafnium, dichloro[1,1'-dimethysilylene(2-methyl-4-phenyl-indenyl) {2-(5-methyl-2-furyl)-4-phenyl-indenyl}]hafnium, dichloro[1,1'-dimethysilylene(2-methyl-4-phenyl-indenyl) {2-(5-methyl-2-thienyl)-4-phenyl-indenyl}]hafnium, or the like.

Among them, still more preferable one is dichloro[1,1'-dimethylsilylenebis{2-(5-methyl-2-furyl)-4-phenyl-indenyl}]hafnium, dichloro[1,1'-dimethylsilylenebis{2-(5-methyl-2-thienyl)-4-phenyl-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-naphthyl-indenyl}]hafnium, dichloro[1,1'-dimethylsilylenebis{2-(5-methyl-2-furyl)-4-(4-t-butylphenyl)-indenyl}]hafnium, and dichloro[1,1'-dimethysilylene(2-methyl-4-phenyl-indenyl) {2-(5-methyl-2-furyl)-4-phenyl-indenyl}]hafnium In addition, particularly preferable one is dichloro[1,1'-dimethylsilylenebis{2-(5-methyl-2-furyl)-4-phenyl-indenyl}]hafnium, dichloro[1,1'-dimethylsilylenebis{2-(5-methyl-2-furyl)-4-naphthyl-indenyl}]hafnium, and
dichloro[1,1'-dimethylsilylenebis{2-(5-methyl-2-furyl)-4-(4-t-butylphenyl)-indenyl}]hafnium.

(2) A Component (b):

Then, the catalyst component (b) used in the present invention is an ion-exchange layered silicate.

(I) Kinds of the Ion-Exchange Layered Silicate

In the present invention, the ion-exchange layered silicate (hereafter it may be abbreviated simply as a silicate) means a silicate compound having a crystal structure, where surfaces constituted by ionic bond etc. are laminated in parallel each other by bonding force, and an ion contained is capable of being exchanged. Most of natural silicate are mainly produced as a main component of clay mineral, and generally purified by dispersing/swelling in water, utilizing difference of deposition rate etc., however, complete removal may be difficult in some cases, resulting in containing impurities (quartz, cristobalite etc.) other than the ion-exchange layered silicate, but containing thereof may be allowed. Depending on kind, amount, particle size, crystallinity, dispersion state of these impurities, there may be preferable more than the pure silicate, and such a composite is also included to the component (b).

It should be noted that a raw material of the present invention indicates the silicate before an execution stage of chemical treatment of the present invention described later. In addition, the silicate used in the present invention is not limited to a natural product, and may be an artificially synthesized substance.

In addition, in the present invention, when the silicate has ion-exchange property before a stage of the addition of chemical treatment, the silicate having physical or chemical property changed by the treatment, and whose ion-exchange property or a layer structure is lost, is also handled as the ion-exchange layered silicate.

As a specific example of the ion-exchange layered silicate, there is included, for example, a layered silicate having a 1:1 type structure or 2:1 type structure, described in "Clay mineralogy", Haruo Siramizu, published from Asakura Publishing Co., Ltd., (1988) etc.

The 1:1 type structure means a structure fundamentally having a laminated 1:1 layer structure by combination of one layer of a tetrahedron sheet and one layer of an octahedron sheet, on the other hand, the 2:1 type structure means a structure fundamentally having a laminated 2:1 layer structure where two layers of tetrahedron sheets sandwich one layer of an octahedron sheet.

As a specific example of the ion-exchange layered silicate having the 1:1 layer as major composition layer, there is included a kaolin-group silicate such as dickite, nacrite, kaolinite, metahalloysite, halloysite; a serpentine-group silicate such as chrysotile, lizardite, antigorite etc.

As a specific example of the ion-exchange layered silicate having the 2:1 layer as major composition layer, there is included a smectite-group silicate such as montmorillonite, beidellite, nontronite, saponite, hectorite, stevensite; a vermiculite-group silicate such as vermiculite; a mica-group silicate such as mica, illite, sericite, glauconite; attapulgite, sepiolite, palygorskite, bentonite, pyrophyllite, talc, chlorites etc. They may form a mixed layer.

Among them, the ion-exchange layered silicate having the 2:1 type layer as major component is preferable. A more preferable one is a smectite-group silicate as a main component, and still more preferable one is montmorillonite as a main component.

Kind of an interlayer cation (a cation contained between layers of the ion-exchange layered silicate) is not especially limited, however, an alkaline metal of group 1 of the periodic table, such as lithium, sodium; an alkaline earth metal of group 2 of the periodic table, such as calcium, magnesium; or a transition metal such as iron, cobalt, copper, nickel, zinc, ruthenium, rhodium, palladium, silver, iridium, platinum, gold, as a main component, is preferable in view of being relatively easily available as an industrial raw material.

(II) Granulation of the Ion-Exchange Layered Silicate

The ion-exchange layered silicate may be used in a dry state, or may be used in a slurry state in fluid. In addition, shape of the ion-exchange layered silicate is not especially limited, and may be shape in natural production or shape in the time of artificial synthesis, or the ion-exchange layered silicate with processed shape, by an operation of crushing, granulation, classification or the like, may be used. Among them, use of the granulated ion-exchange layered silicate is particularly preferable, because of furnishing good polymer particle property, when the ion-exchange layered silicate is used as a catalyst component.

Processing of shape of the ion-exchange layered silicate, such as granulation, crushing, classification or the like, may be executed before chemical treatment (that is, the following chemical treatment may be executed to the ion-exchange layered silicate whose shape is processed in advance), or shape may be processed after execution of chemical treatment.

A granulation method used here includes, for example, a stirring granulation method, a spraying granulation method, a rolling granulation method, briquetting, compacting, an extrusion granulation method, a fluidized-bed granulation method, an emulsifying granulation method, a granulation method in fluid, a compression molding granulation method or the like, and not especially limited. Preferably, a stirring granulation method, a spraying granulation method, a rolling granulation method and a fluidized-bed granulation method are included, and particularly preferably, a stirring granulation method and a spraying granulation method are included.

It should be noted that, in execution of a spraying granulation, as a dispersion medium of raw material slurry, water or an organic solvent such as methanol, ethanol, chloroform, methylene chloride, pentane, hexane, heptane, toluene and xylene is used. Preferably water is used as the dispersion medium. Concentration of the component (b) in the raw material slurry fluid for spraying granulation, to obtain spherical particles, is 0.1 to 30% by weight, preferably 0.5 to 20% by weight, and particularly preferably 1 to 10% by weight. Entrance temperature of hot air for spraying granulation, to obtain spherical particles, depends on the dispersion medium, however, when water is used, it is 80 to 260° C. and preferably 100 to 220° C.

In granulation, to obtain a carrier with high particle strength, and to enhance propylene polymerization activity, the silicate salt is finely crushed, if necessary. The silicate salt may be crushed finely by any method. The method for fine crushing may be any of a dry-type crushing and a wet-type crushing. The preferable method is the wet-type crushing, using water as the dispersion medium, and utilizing swelling property of the silicate salt, and includes, for example, a method by forced stirring using "Polytron" etc., or a method with "DYNO Mill, "Pearl Mill" etc. Average particle size before granulation is 0.01 to 3 μm, and preferably 0.05 to 1 μm.

In addition, in granulation, an organic substance, an inorganic solvent, an inorganic salt, and various binders may be used. The binders used include, for example, (magnesium chloride, aluminum sulfate, aluminum chloride, magnesium sulfate, alcohols and glycols etc.

The spherical particles obtained as above preferably have a compressive breaking strength of 0.2 MPa or higher, to suppress fracture or generation of fines in the polymerization step. In addition, particle size of the granulated ion-exchange layered silicate is in a range of 0.1 to 1000 μm, and preferably 1 to 500 μm. The crushing method is also not especially limited, and may be any of a dry-type crushing and a wet-type crushing.

(III) Chemical Treatment of the Ion-Exchange Layered Silicate

The ion-exchange layered silicate of the catalyst component (b) relevant to the present invention, may be used as it is without treatment particularly, however, it is preferable to be chemically treated, and the chemical treatment of the ion-exchange layered silicate means to contact the ion-exchange layered silicate with acids, salts, alkalis, organic substances and the like.

Common influence by chemical treatment includes execution of interlayer cation exchange, and various chemical treatments have the following various effects other than this. For example, according to acid treatment with acids, impurities at the surface of the silicate salt are removed, as well as surface area can be increased by elution of cations such as Al, Fe, Mg, in a crystal structure. This effect contributes to increase acid strength of the silicate salt, as well as increase acid points amount per unit weight.

Alkali treatment with alkalis provides structural change of clay mineral, by destruction of a crystal structure of the clay mineral.

A specific example of the treatment agent will be shown below. It should be noted that, in the present invention, a combination of the following acids and salts may be used as the treatment agent. In addition, these acids and salts may be used in combination.

(i) Acids

Acid treatment removes impurities at the surface, or exchanges a cation present between layers, and in addition is capable of eluting a part of or all of cations such as Al, Fe, Mg, incorporated in a crystal structure. Acids used in acid treatment include hydrochloric acid, nitric acid, sulfuric acid, phosphoric acid, acetic acid, oxalic acid, benzoic acid, stearic acid, propionic acid, acrylic acid, maleic acid, fumaric acid, phthalic acid and the like. Among them, an inorganic acid is preferable, and sulfuric acid, hydrochloric acid and nitric acid is preferable, and sulfuric acid is still more preferable.

(ii) Salts

Salts are exemplified by those constituted of a cation selected from the group consisting of an organic cation, an inorganic cation and a metal ion, and an anion selected from the group consisting of an organic anion, an inorganic anion and a halide ion. For example, there are included, as preferable examples, compounds constituted of a cation having at least one kind of an atom selected from the group 1 to 14 of the periodic table and at least one kind of an anion selected from a halogen anion, an inorganic Broensted acid anion and an organic Broensted acid anion.

As a specific example of such salts, there is included LiCl, LiBr, $Li_2SO_4$, $Li_3(PO_4)$, $LiNO_3$, $Li(OOCCH_3)$, NaCl, NaBr, $Na_2SO_4$, $Na_3(PO_4)$, $NaNO_3$, $Na(OOCCH_3)$, KCl, KBr, $K_2SO_4$, $K_3(PO_4)$, $KNO_3$, $K(OOCCH_3)$, $CaCl_2$, $CaSO_4$, $Ca(NO_3)_2$, $Ca_3(C_6H_5O_7)_2$, $Ti(OOCCH_3)_4$, $MgCl_2$, $MgSO_4$, $Mg(NO_3)_2$, $Mg_3(C_6H_5O_7)_2$, $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CO_3)_2$, $Zr(No_3)_4$, $Zr(SO_4)_2$, $ZrF_4$, $ZrCl_4$ etc.

In addition, there is included $Cr(OOCH_3)_2OH$, $Cr(CH_3COCHCOCH_3)_3$, $Cr(NO_3)_3$, $Cr(ClO_4)_3$, $CrPO_4$, $Cr_2(SO_4)^3$, $CrO_2Cl_3$, $CrF_3$, $CrCl_3$, $CrBr_3$, $CrI_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $MnBr_3$, $FeI_3$, $FeC_6H_5O_7$, $Co(OOCH_3)_2$ etc.

Still more, there is included $CuCl_2$, $CuBr_2$, $Cu(NO_3)_2$, $CuC_2O_4$, $Cu(ClO_4)_2$, $CuSO_4$, $Cu(OOCCH_3)_2$, $Zn(OOCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $ZnBr_2$, $ZnI_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$ etc.

Among them, preferable one is compound, where the anion is constituted of an inorganic Broensted acid or a halogen, and the cation is constituted of Li, Mg and Zn.

As particularly preferable compound among such salts, specifically there is LiCl, $Li_2SO_4$, $MgCl_2$, $MgSO_4$, $ZnCl_2$, $ZnSO_4$, $Zn(NO_3)_2$ and $Zn_3(PO_4)_2$.

(iii) Other Treatment Agents

Other than treatment with acids and salts, the following treatment with alkalis or organic substances may be executed, if necessary. As the alkali treatment agents, LiOH, NaOH, KOH, $Mg(OH)_2$, $Ca(OH)_2$, $Sr(OH)_2$, $Ba(OH)_2$ etc. are exemplified.

As an example of organic treatment agents, trimethylammonium, triethylammonium, tripropylammonium, tributylammonium, dodecylammonium, N,N-dimethylanilinium, N,N-diethylanilinium, N,N-2,4,5-pentamethylanilinium, N,N-dimethyloctadecylammonium, and octadodecylammonium is exemplified, however, not limited thereto.

In addition, these treatment agents may be used alone or two or more kinds may be used in combination. As for the combination thereof, the treatment agents to be added may be combined before starting the treatment, or the treatment agents to be added may be combined in the midst of the treatment. In addition, chemical treatment may be executed in plurality of times by using the same or different treatment agent.

(iv) Chemical Treatment Condition

The above various treatment agents may be used as treatment solutions by dissolving them into suitable solvents, or the treatment agents themselves may be used as solvents. Solvents used are not especially limited, however, water and alcohols are general, and particularly water is preferable. For example, when acid treatment is executed as chemical treatment, by controlling concentration of the acid treatment agents, ratio of the ion-exchange layered silicate to the treatment agents, and treatment condition such as treatment time and treatment temperature, the ion-exchange layered silicate can be changed and controlled to predetermined composition and structure.

As for such a concentration of the acid treatment agents, it is preferable to execute treatment with acids with concentration (N) of the acid treatment agent satisfying the following equation.

$$N \geq 1.0$$

wherein acid concentration N shown here is defined by mol number of the acid×valency of the acid/volume of the aqueous acid solution (unit: mol/L). Provided that, when a salt is present together, amount of water of crystallization contained in the salt compound should be taken into consideration, however, volume change by the salt should not be taken into consideration. It should be noted that as for specific gravity of the aqueous acid solution, Chemical Handbook, fundamental part, II, p 6 (edited by The Japan Chemical Society, published by Maruzen Co., Ltd., the third revised version) was referred to. It should be noted that the upper limit of the acid concentration N is 20 or lower, and particularly 15 or lower, in view of safety and easiness in handling, and equipment aspect.

Ratio of the ion-exchange layered silicate to the treatment agent is not especially limited, however, preferably the ion-exchange layered silicate [g]: the treatment agent [valency× mol number of the acid]=about 1:0.001 to 1:0.1.

In addition, acid treatment temperature is preferably in a range of room temperature to boiling temperature of the treatment agent solution, treatment time is selected from condition of 5 minutes to 24 hours, and it is preferable to be executed under condition that at least a part of substances constituting the ion-exchange layered silicate is removed or exchanged. Condition of acid treatment is not especially limited, however, when sulfur is used as the above chemical treatment, it is preferable to set that treatment temperature is 80° C. to boiling temperature of the treatment agent solvent or lower, and treatment time is 0.5 hour or longer and less than 5 hours.

(IV) Drying of the Ion-Exchange Layered Silicate

After execution of the chemical treatment, excess treatment agents, and ions eluted by the treatment can be removed. In this case, generally, liquid such as water or an organic solvent is used. After dehydrating, drying is executed, and generally it can be executed at a drying temperature of 100 to 800° C., and preferably 150 to 600° C. The drying temperature of over 800° C. is not preferable due to generation risk of structure destruction of the silicate salt.

These ion-exchange layered silicate undergo characteristics change by drying temperature, even without structure destruction, therefore it is preferable to change drying temperature in response to applications. Drying time is usually 1 minute to 24 hours, and preferably 5 minutes to 4 hours, and the atmosphere is preferably dry air, dry nitrogen, dry argon or under reduced pressure. Drying methods are not especially limited, and drying may be executed by various methods.

(V) Composition of the Ion-Exchange Layered Silicate after Chemical Treatment

It is preferable that composition of the ion-exchange layered silicate after chemical treatment, as the catalyst component (b) relevant to the present invention, is in a range of 0.01 to 0.25, preferably 0.03 to 0.24, and still more 0.05 to 0.23 as Al/Si atomic ratio. The Al/Si atomic ratio is taken as an index of acid treatment intensity of clay part. In addition, as a method for controlling the Al/Si atomic ratio within the above range, a method for execution of chemical treatment described in the above (III), by using montmorilonite, as the ion-exchange layered silicate before chemical treatment, is included.

Aluminum and silicon in the ion-exchange layered silicate are measured by preparation of a calibration curve by a chemical analysis method according to a JIS method, and by a quantitative determination method with fluorescent X-ray.

(3) The Component (c):

The catalyst component (c) used in the present invention is an organoaluminum compound, and preferably the organoaluminum compound represented by the general formula $(AlR_nX_{3-n})_m$ is used, wherein R represents an alkyl group having carbon atoms of 1 to 20; X represents a halogen, hydrogen, an alkoxy group or an amino group; n represents an integer of 1 to 3; and m represents an integer of 1 to 2. The organoaluminum compound may be used alone or a plurality of kinds may be used in combination.

As a specific example of the organoaluminum compound there is included trimethylaluminum, triethylaluminum, trinormalpropylaluminum, trinormalbutylaluminum, triisobutylaluminum, trinormalhexylaluminum, trinormolocty-laluminum, trinormaldecylaluminum, diethylaluminum chloride, diethylaluminum sesquichloride, diethylaluminum hydride, diethylaluminum ethoxide, diethylaluminum dimethylamide, diisobutylaluminum hydride, diisobutylaluminum chloride etc. Among them, preferable one is a trialkylaluminum and an alkylaluminum hydride, wherein m=1 and n=3. Still more preferable one is a trialkylaluminum wherein R is carbon atoms of 1 to 8.

(4) Preparation of a Catalyst:

A catalyst for olefin polymerization relevant to the present invention contains the above component (a), component (b) and component (c). They may be contacted each other inside a polymerization reactor, or outside the polymerization reactor, for preliminary polymerization in the presence of an olefin.

The olefin means a hydrocarbon containing at least one double bond between carbons, and there is exemplified ethylene, propylene, 1-butene, 1-hexene, 3-methylbutene-1, styrene, divinylbenzene etc., however, kind thereof is not especially limited, and a mixture of these with other olefin may be used. Preferably it is an olefin having carbon atoms of 3 or more.

Use amount of the above component (a), component (b) and component (c) is arbitrary, however, it is preferable that they are contacted so as to achieve for ratio of a transition metal in the component (b) to aluminum in component (c) to be 0.1 to 1000 (μ mol): 0 to 100,000 (p mol) per 1 g of the component (a). In addition to the above component (a), other kinds of complexes may be used, as long as a substance of the present invention can be produced.

In this case, it is preferable to combine a metallocene compound, which is capable of copolymerizing a macromer having terminal vinyl, which is produced by the above catalyst component (a), and producing a polymer with higher molecular weight, as compared with the catalyst component (a), and by combination with such a metallocene compound, a polymer having further enhanced melt property and mechanical property, which are requirements of the present invention, can be obtained.

Such a metallocene compound includes the catalyst component (a-2) represented by the general formula (2);

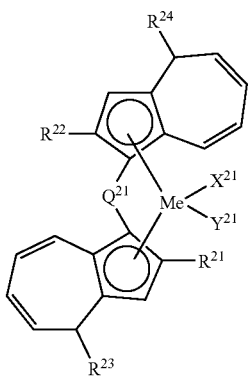

The general formula (2)

The compound represented by the above general formula (2) is a metallocene compound, and in the general formula (2), $Q^{21}$ is a bonding group for cross-linking two conjugated five-member cyclic ligands, and a bivalent hydrocarbon group having carbon atoms of 1 to 20, a silylene group with a hydrocarbon group having carbon atoms of 1 to 20, or a germylene group with a hydrocarbon group having carbon atoms of 1 to 20, and preferably, a substituted silylene group or a substituted germylene group. The substituent bonding to silicon and germanium is preferably a hydrocarbon group having carbon atoms of 1 to 12, and the two substituents may be bonded together. As a specific example there is included methylene, dimethylmethylene, ethylene-1,2-diyl, dimethylsilylene, diethylsilylene, diphenylsilylene, methylphenylsilylene, 9-silafluorene-9,9-diyl, dimethylsilylene, diethylsilylene, diphenylsilylene, methylphenylsilylene, 9-silafluorene-9,9-diyl, dimethylgermylene, diethylgermylene, diphenylgermylene, methylphenylgermylene etc.

In addition, Me represents zirconium or hafnium, preferably hafnium.

Still more, $X^{21}$ and $Y^{21}$ are auxiliary ligands to generate an active metallocene having polymerization ability of an olefin by a reaction with a co-catalyst of the component [b]. Therefore, $X^{21}$ and $Y^{21}$ is not especially limited on kind of the ligand, as long as this object is achieved, and represents each independently a hydrogen atom, a halogen group, a hydrocarbon group having carbon atoms of 1 to 20, an alkoxy group having carbon atoms of 1 to 20, an alkyl amide group having carbon atoms of 1 to 20, a trifluoromethane sulfonic acid group, a hydrocarbon group containing phosphorus and having carbon atoms of 1 to 20, or a hydrocarbon group containing silicon and having carbon atoms of 1 to 20.

In the general formula (2), $R^{21}$ and $R^{22}$ each independently represent a hydrocarbon group having carbon atoms of 1 to 6, preferably an alkyl group, and still more preferably an alkyl group having carbon atoms of 1 to 4. As a specific example there is included methyl, ethyl, n-propyl, i-propyl, n-butyl, i-butyl, sec-butyl, n-pentyl, i-pentyl, n-hexyl etc., preferably methyl, ethyl and n-propyl.

In addition, $R^{23}$ and $R^{24}$ each independently represent an aryl group having carbon atoms of 6 to 30, preferably carbon atoms of 6 to 24, which may contain halogen, silicon or a plurality of hetero elements selected from these. A preferable example includes phenyl, 3-chlorophenyl, 4-chlorophenyl, 3-fluorophenyl, 4-fluorophenyl, 4-methylphenyl, 4-i-propylphenyl, 4-t-butylphenyl, 4-trimethylsilylphenyl, 4-(2-fluorobiphenylyl), 4-(2-chlorobiphenylyl), 1-naphthyl, 2-naphthyl, 3,5-dimethyl-4-t-butylphenyl, 3,5-dimethyl-4-trimethylsilylphenyl etc.

As a non-limiting example of the metallocene compound, the following one is included.

For example, there is included
dichloro{1,1'-dimethylsilylenebis(2-methyl-4-phenyl-4-hydroazulenyl)}hafnium,
dichloro[1,1'-dimethylsilylenebis{2-methyl-4-(4-chlorophenyl)-4-hydroazulenyl}]hafnium,
dichloro[1,1'-dimethylsilylenebis{2-methyl-4-(4-t-butylphenyl)-4-hydroazulenyl}]hafnium,
dichloro[1,1'-dimethylsilylenebis{2-methyl-4-(4-trimethylsilylphenyl)-4-hydroazulenyl}]hafnium,
dichloro[1,1'-dimethylsilylenebis{2-methyl-4-(3-chloro-4-t-butylphenyl)-4-hydroazulenyl}]hafnium,
dichloro[1,1'-dimethylsilylenebis{2-methyl-4-(3-methyl-4-t-butylphenyl)-4-hydroazulenyl}]hafnium,
dichloro[1,1'-dimethylsilylenebis{2-methyl-4-(3-chloro-4-trimethylsilylphenyl)-4-hydroazulenyl}]hafnium,
dichloro[1,1'-dimethylsilylenebis{2-methyl-4-(3-methyl-4-trimethylsilylphenyl)-4-hydroazulenyl}]hafnium,
dichloro[1,1'-dimethylsilylenebis{2-methyl-4-(1-naphthyl)-4-hydroazulenyl}]hafnium,
dichloro[1,1'-dimethylsilylenebis{2-methyl-4-(2-naphthyl)-4-hydroazulenyl}]hafnium,
dichloro[1,1'-dimethylsilylenebis{2-methyl-4-(2-fluoro-4-biphenyl)-4-hydroazulenyl}]hafnium,
dichloro[1,1'-dimethylsilylenebis{2-methyl-4-(2-chloro-4-biphenyl)-4-hydroazulenyl}]hafnium,
dichloro[1,1'-dimethylsilylenebis{2-methyl-4-(9-phenanthryl)-4-hydroazulenyl}]hafnium,
dichloro[1,1'-dimethylsilylenebis{2-methyl-4-(4-chloro-2-naphthyl)-4-hydroazulenyl}]hafnium,
dichloro[1,1'-dimethylsilylenebis{2-ethyl-4-(4-chlorophenyl-4-hydroazulenyl}]hafnium,
dichloro[1,1'-dimethylsilylenebis{2-n-propyl-4-(3-chloro-4-trimethylsilylphenyl)-4-hydroazulenyl}]hafnium,
dichloro[1,1'-dimethylsilylenebis{2-ethyl-4-(3-chloro-4-t-butylphenyl)-4-hydroazulenyl}]hafnium,
dichloro[1,1'-dimethylgermylenebis{2-methyl-4-(2-fluoro-4-biphenyl)-4-hydroazulenyl}]hafnium,
dichloro[1,1'-dimethylgermylenebis{2-methyl-4-(4-t-butylphenyl)-4-hydroazulenyl}]hafnium,
dichloro[1,1'-(9-silafluorene-9,9-diyl)bis{2-ethyl-4-(4-chlorophenyl)-4-hydroazulenyl}]hafnium etc.

In addition, when other kind of the catalyst component (a-2) is used, ratio of the catalyst component (a-2) to total amount of the catalyst component (a) and the catalyst component (a-2) is arbitrary, within a range satisfying characteristics of the propylene-based polymer, however, preferably 0.01 to 0.7. By changing this ratio, balance of melt property and catalytic activity can be adjusted, and to produce the propylene-based polymer for applications requiring higher melt property and higher catalytic activity, the ratio is particularly preferably in a range of 0.10 to 0.60, and still more preferably 0.2 to 0.5.

Order of contacting the component (a), component (b) and component (c) is arbitrary, and after contacting two of them, the remaining one may be contacted, or three components may be contacted at the same time. In contacting these, in order to execute contacting sufficiently, a solvent may be used. As the solvent, an aliphatic saturated hydrocarbon, an aromatic hydrocarbon, an aliphatic unsaturated hydrocarbon, or a halide thereof, or a monomer for preliminary polymerization etc. is exemplified. As an example of the aliphatic saturated hydrocarbon and the aromatic hydrocarbon, specifically hexane, heptanes, toluene etc. is included. In addition, as the monomer for preliminary polymerization, propylene may be used as a solvent.

[Preliminary Polymerization]:

A catalyst relevant to the present invention, as described above, is preferably subjected to preliminary polymerization treatment, where it is contacted with an olefin and polymerized in small amount. The olefin used is not especially limited, and as described above, there may be exemplified ethylene, propylene, 1-butene, 1-hexene, 1-octene, 4-methyl-1-pentene, 3-methyl-1-butene, vinylcycloalkane, styrene etc. As a method for feeding the olefin, an arbitrary method may be adopted such as methods for feeding the olefin to a reactor, so as to maintain constant rate or in a constant pressure state, or combination thereof, a method for changing stepwise etc.

Temperature and time of the preliminary polymerization are not especially limited, however, they are preferably in a range of −20° C. to 100° C., and 5 minute to 24 hours, respectively. In addition, amount of the preliminary polymerization is, as weight ratio of the preliminary polymerized polymer to the component (b), preferably 0.01 to 100, and still more preferably 0.1 to 50. In addition, the component (c) may be added during the preliminary polymerization.

Such a method may be adopted that makes present a solid of a polymer such as polyethylene, polypropylene, and an inorganic oxide such as silica, titania, during contacting or after contacting of the above each component.

After the preliminary polymerization, the catalyst may be dried. A drying method is not especially limited, however, drying under reduced pressure or drying under heating, drying by passing dried gas, or the like is exemplified, and these methods may be used alone or two or more kinds may be used in combination. In the drying step, the catalyst may be stirred, vibrated, fluidized or stood still.

[Detailed Explanation of a Polymerization Method]

As for a polymerization method, any system may be adopted, as long as a catalyst for polymerization of an olefin, constituted of the above component (a), component (b) and component (c), and a monomer contact efficiently. Specifically, there may be adopted a slurry method using an inert solvent; a bulk polymerization method using propylene as a solvent, without substantially using an inert solvent; or a gas phase polymerization method where each monomer is maintained in a gaseous state, without substantially using a liquid solvent.

In addition, as a polymerization system, any of a method for executing continuous polymerization, batch polymerization or preliminary polymerization may be applied.

In addition, polymerization stage number is not especially limited, as long as it is capable of producing a substance of the present invention, however, also a system of 2-stage bulk polymerization, gas-phase polymerization after bulk polymerization, 2-stage gas-phase polymerization etc. may be possible, and still more it is possible to produce it by polymerization stages of more than that.

In order to produce a substance disclosed in the present invention, it is necessary to produce a crystalline propylene macromer containing high vinyl terminal in the first step, and copolymerize propylene and ethylene and/or an α-olefin, in the second step. By sequential polymerization in such an order, the crystalline propylene-based macromer produced in the first step is copolymerized in the second step, by which a polymer of the present invention having a branched structure with a crystalline segment as a side chain, and with an amorphous segment as a main chain can be produced.

In addition, in order to obtain a compound disclosed in the present invention, it is preferable that the first step is executed by bulk polymerization, and the second step is executed by gas-phase polymerization, or both the first step and the second step are executed by gas-phase polymerization. A reason for that, there is included reduction of environmental load as well as simplification of production step, by not using a solvent substantially.

[The First Step]:

In slurry polymerization, as a polymerization solvent, a saturated aliphatic or aromatic hydrocarbon such as hexane, heptane, pentane, cyclohexane, benzene, toluene is used alone or as a mixture. Polymerization temperature is 0 to 150° C., and in addition, as a molecular weight regulator, hydrogen may be used supplementarily. Polymerization pressure is suitably 0 to 3 MPaG, and preferably 0 to 2 MPaG.

In bulk polymerization, polymerization temperature is 0 to 80° C., preferably 60 to 90° C., preferably 70 to 80° C. Polymerization pressure is suitably 0 to 5 MPaG, and preferably 0 to 4 MPaG.

In gas-phase polymerization, polymerization temperature is 0 to 200° C., preferably 60 to 120° C., and still more preferably 70 to 100° C. Polymerization pressure is suitably 0 to 4 MPaG, and preferably 0 to 3 MPaG.

In addition, it is preferable that hydrogen, as a molecular weight regulator, is not used, because hydrogen suppresses chain transfer and increases content of terminal vinyl.

It is considered that a part of the crystalline propylene macromer generated in this step is copolymerized at the same time, and generates a polymer having a branched structure with a crystalline propylene polymer segment at both a main chain and a side chain.

[The Second Step]:

In gas-phase polymerization, polymerization temperature is 20 to 90° C., preferably 30 to 80° C., and still more preferably 50 to 80° C. In addition, hydrogen, as a molecular weight regulator, may be used supplementarily. Polymerization pressure is suitably 0.5 to 4 MPaG, and preferably 0.5 to 3 MPaG.

Here, it is considered that the crystalline propylene macromer generated in the first step is copolymerized and generates a copolymer having a crystalline propylene polymer segment as a side chain, and an amorphous propylene copolymer segment as a main chain.

In addition, when ethylene is used as a comonomer, a polymer having the objective ethylene content can be produced by controlling ethylene gas composition in gas phase.

For example, in order to produce an amorphous propylene-ethylene copolymer having the ethylene content of 40 to 60% by weight, it is necessary to control ethylene gas composition in gas phase to 50% by mol or higher, preferably 60% by mol or higher, and still more preferably 65% by mol or higher. In addition, the upper limit is 90% by mole or lower, preferably 87% by mole or lower and still more preferably 85% by mole or lower.

In addition, in order to produce an amorphous propylene-ethylene copolymer having the ethylene content of 10 to 40% by weight, it is necessary to control ethylene gas composition in gas phase to 10% by mol or higher, preferably 15% by mol or higher, and still more preferably 20% by mol or higher. In addition, the upper limit is 65% by mole or lower, preferably 60% by mole or lower and still more preferably 50% by mole or lower. Here, it is considered that a part of the amorphous propylene copolymer generated, having low content of vinyl terminal, is copolymerized and generates a polymer having a branched structure with an amorphous propylene polymer segment at both a main chain and a side chain.

The resulting propylene-based polymer of the present invention has characteristics in that (i) weight average molecular weight (Mw) measured with GPC is from 100,000 to 1,000,000, (ii) content of the component insoluble in hot p-xylene is 0.3% by weight or lower, and (iii) degree of strain hardening (λ max) in measurement of elongational viscosity is 2.0 or higher.

In addition, the resulting propylene-based polymer of the present invention desirably have (iv) MFR (test condition: 230° C., 2.16 kg load) of 0.1 to 300 g/10 minutes, and (v) ME (memory effect) of 1.4 to 3.4.

The MFR of below 0.1 g/10 minutes decreases fluidity, and also decreases rigidity. On the other hand, the MFR of over 300 g/10 minutes decreases melt moldability. In addition, among this range, the MFR is preferably 0.5 to 100 g/10 minutes, still more preferably 2 to 70 g/10 minutes, and particularly preferably 2 to 50 g/10 minutes.

Still more, the ME (memory effect) of below 1.4 generates flow mark in injection molding and provides appearance defect, on the other hand, the ME of over 3.4 generates weld and similarly provides appearance defect, and thus not preferable. The ME is still more preferably 1.5 to 2.4.

4. A Resin Composition (1) Additional Components

The resin composition composed of the components (Z) and (M) of the present invention may also be added with the following additional components further.

(i) An Elastomer Component

In the present invention, ethylene/α-olefin-based elastomer or styrene-based elastomer may be added in a range of 0 to 70 parts by weight relative to 100 parts by weight of the resin composition constituted of the components (Z) and (M).

The ethylene/α-olefin-based elastomer or styrene-based elastomer is used to enhance impact resistance and also express good moldability, property and shrinkage characteristics.

In the ethylene/α-olefin-based elastomer, a comonomer copolymerized with ethylene includes an α-olefin having carbon atoms of 4 to 20, specifically, 1-octene, 1-butene etc., and it is not necessarily one kind but it may be a mixture of two or more kinds of the ethylene/α-olefin-based elastomer or styrene-based elastomer. Content of the α-olefin in the ethylene/α-olefin-based elastomer is 10 to 60% by weight, and preferably 20 to 50% by weight, and density is 0.85 to 0.90 $cm^3$, and preferably 0.86 to 0.88 $cm^3$.

In addition, the styrene-based elastomer is a block or random copolymer of styrene and ethylene, propylene, 1-butene, butadiene, isoprene etc., or a hydrogenated substance thereof, and one having an amount of bound styrene in the styrene-based elastomer of 5 to 45% by weight, and preferably 10 to 40% by weight, and a density is 0.88 to 0.95 $cm^3$, and preferably 0.89 to 0.92 $cm^3$.

MFR of the elastomer component, at 230° C. and a load of 2.16 kg, is 0.1 to 20 g/10 minutes, and preferably 0.5 to 10 g/10 minutes. The MFR of below 0.1 g/10 minutes provides inferior moldability or coating property, on the other hand, the MFR of over 20 g/10 minutes provides inferior impact resistance.

The ethylene/α-olefin-based elastomer can be produced by polymerization using a known titanium-based catalyst or a metallocene catalyst. Styrene-based elastomer can be produced by a usual anion polymerization method and hydrogenation technology of the resulting polymer.

Formulation amount of the ethylene/α-olefin-based elastomer and styrene-based elastomer is 0 to 70 parts by weight, and in applications where impact property is important, preferably 5 to 50 parts by weight, and particularly preferably 10 to 40 parts by weight. The amount of the ethylene/α-olefin copolymer-based elastomer of over 70 parts by weight significantly decreases rigidity and heat resistance of the propylene-based resin composition, and thus not preferable.

(ii) An Inorganic Filler

In the present invention, an inorganic filler may be added in a range of 0 to 70 parts by weight relative to 100 parts by weight of the resin composition constituted of the components (Z) and (M).

The inorganic filler used in the present invention includes talc, wollastonite, calcium carbonate, barium sulfate, mica, glass fiber, carbon fiber, clay and organic clay, and preferably is talc, mica, glass fiber, carbon fiber, and particularly preferable one is talc. Talc is effective to enhance rigidity or dimensional stability of a molded articles and adjustment thereof.

Particle size (including fiber diameter) of the inorganic filler depends on inorganic compounds used, however, in the case of fibers, 3 to 40 μm as fiber diameter, and for particulate substances, about 1.5 to 150 μm as particle size. For talc, which is a suitable inorganic filler, average particle size is preferably 1.5 to 40 μm, and particularly preferably 2 to 15 μm. The average particle size of talc of below 1.5 μm provides aggregation and deteriorates appearance, on the other hand, the average particle size of talc of over 40 μm decreases impact strength, and thus not preferable.

The particulate substance such as talc is produced generally, by a method, for example, first for crushing talc rude ore with an impact type crusher or a micron mill type crusher, and further after crushing with a jet mill etc., by classification adjustment with a cyclone or a micron separator etc.

Talc may be a surface treated one with various kinds of metal soap, or so-called compressed talc, having an apparent specific volume of 2.50 ml/g or lower, may be used.

Average particle size of the above particulate substance is value measured by using a grain size distribution meter of a laser diffraction scattering system, and as the measurement apparatus, for example, LA-920 model, manufactured by Horiba Ltd. is preferable because of having excellent measurement precision. In addition, fiber diameter of carbon fiber or glass fiber is calculated by cutting the fiber, in general, vertically to a fiber direction, observing cross-section thereof with a microscope to measure diameter, and averaging data on 100 fibers or more.

Formulation amount of the inorganic filler to a composition is preferably 5 to 70 parts by weight, more preferably 7 to 50 parts by weight, and particularly preferably 10 to 40 parts by weight. The amount of the inorganic filler of below 5 parts by weight provides insufficient improvement effect of rigidity, while the amount of over 70 parts by weight decreases impact resistance of the propylene-based resin composition, and thus not preferable.

(2) Other Components (i) Use of the Additives

Into the resin composition of the present invention, additives may be formulated to enhance performance of the composition of the present invention, or to furnish other performance, within a range not to impair function of the present invention.

As the additional components, various additives may be added such as a nucleation agent, a phenol-based antioxidant, a phosphorous-based antioxidant, a sulfur-based antioxidant, a neutralizer, a light stabilizer, a UV absorbing agent, a lubricant, an antistatic agent, a metal deactivator, a peroxide, a filler, an antibacterial agent, an antimold agent, a fluorescent brightening agent, a colorant, an electric conductivity furnishing agent, which are generally used as formulation agents for a polyolefin resin.

Formulation amount of these additives is, in general, 0.0001 to 5 parts by weight, and preferably 0.001 to 3 parts by weight relative to 100 parts by weight of the composition.

(ii) Use of Other Resins

Into the resin composition of the present invention, other resin materials may be formulated to enhance performance of the composition of the present invention, or to furnish other performance, within a range not to impair function of the present invention.

As the additional components, there may be added LLDPE, LDPE, HDPE, modified polypropylene, polycarbonate, polyamide, modified PPE etc., which are generally used as formulation materials for a polyolefin resin.

Formulation amount of these resins is, in general, 0.5 to 10 parts by weight, and preferably 1 to 5 parts by weight, relative to 100 parts by weight of the composition.

(3) Production of a Resin Composition

In the present invention, the propylene-based resin composition of the present invention is obtained by formulating the above components, that is, the propylene-based polymer composition, and, if necessary, elastomer, inorganic fillers, other components etc., in the above formulation ratio, and by kneading and granulating them, using a usual kneader such as a single-screw extrude, a twin-screw extruder, a Banbury mixer, a roll mixer, a "Brabender plastograph", a kneader.

In this case, it is preferable to select the kneading and granulating method achieving good dispersion of each component, and it is usually executed using a twin-screw extruder. In this kneading and granulating, a formulated substance of the above each component may be kneaded at the same time, or sequentially kneaded. In addition, in order to enhance performance, a method for kneading each component dividedly may be adopted.

(4) Applications of the Resin Composition

The resin composition of the present invention has sufficiently enhanced balance of rigidity or heat resistance and impact resistance, therefore useful as various industrial materials starting from interior and exterior parts of vehicles such as automobiles, or wrapping and packaging materials of electric appliances.

EXAMPLES

Explanation will be given below still more specifically on the present invention with reference to Examples, however, the present invention should not be limited to the following Examples, unless it is outside the gist thereof. It should be noted that property measurement, analysis etc. in the following Examples are in accordance with the following methods.

(1) Melt Flow Rate (MFR)

MFR was measured under the following condition, according to JIS K7201 A method, condition M.

Test temperature: 230° C., nominal load: 2.16 kg, die shape: a diameter of 2.095 mm and a length of 8.000 mm. Unit is g/10 minutes.

(2) Weight Average Molecular Weight (Mw)

Mw was measured by a method described in the present description, with gel permeation chromatography (GPC).

(3) mm Fraction

It was measured by a method described in the present description, by using GSX-400, FT-NMR, manufactured by JEOL Co., Ltd.

(4) Elongational Viscosity

It was measured by a method described in the present description, by using a Rheometer.

(5) Melt Temperature (Tm)

It was measured by using DSC, manufactured by Seiko Holdings Corp.

5.0 mg of a sample is weighed and held at 200° C. for 5 minutes, and then crystallized in a temperature decreasing rate of 10° C./minute down to 40° C. to erase thermal history thereof, and peak temperature of a melting curve, in still more melting in a temperature increasing rate of 10° C./minute, is defined as melt temperature observed. When a resin has a plurality of melt temperatures observed, one observed at the highest temperature is defined as melt temperature of the resin.

(6) Quantitative Determination of Ethylene Content

Average ethylene content in a copolymer was measured using an IR spectrophotometer. Measurement condition is shown below.

Apparatus: FTIR-8300, manufactured by Shimadzu Corp.
Resolution: 4.0 $cm^{-1}$
Measurement range: 4,000 to 400 $cm^{-1}$
Sample preparation: Polymer powder or pellet is heated with a compression press to prepare a film with a thickness of 500 μm (pressurized to 100 MPa after 2 minutes of preheating at a temperature of 190° C.)
Data processing:
(i) By making 760 and 700 $cm^{-1}$ as base points, absorption peak area in this range is calculated (it corresponds to ethylene content).
(ii) Peak area/sample thickness is calculated.
(iii) A calibration curve is prepared in advance, using samples whose ethylene contents were quantitatively determined in advance with NMR, and ethylene content is quantitatively determined by the equation of [ethylene content-peak area/sample thickness].

(7) ME (Memory Effect):

By using a melt indexer, manufactured by Takara Co., Ltd., a sample was extruded at 190° C. under load, through an orifice with a diameter of 1.0 mm, and a length of 8.0 mm, and a polymer extruded from the orifice, when extrusion rate is 0.1 g/min., was quenched in methanol, to calculate ME as value obtained by dividing value of the strand diameter at this time with orifice diameter. This value correlates to MFR, and the higher value shows the larger swell, and improves product appearance in injection molding.

(8) Flexural Characteristics:

Flexural Modulus:

Flexural modulus of the resulting composition was evaluated under the following condition.

Specification No.: In accordance with JIS K-7171 (ISO178)
   Testing machine: Autograph AG-20kNG (manufactured by Shimadzu Corp.)
Sampling direction of a test piece: In flow direction
Shape of a test piece: A thickness of 4 mm, a width of 10 mm and a length of 80 mm
A preparation method of a test piece: Injection molding
Sample conditioning: To be held in a temperature-controlled room, adjusted at room temperature 23° C. and a humidity of 50%, for 24 hours or longer
Test room: A temperature-controlled room adjusted at room temperature 23° C. and a humidity of 50%
Number of a test piece: 5
Distance between supporting points: 32.0 mm
Test speed: 1.0 mm/min (9) Impact Strength:

Impact strength was evaluated by a Charpy impact test.
Specification No.: In accordance with JIS K-7111 (ISO0179/1eA)
Testing machine: Full automatic Charpy impact testing machine, manufactured by Toyo Seiki Co., Ltd. (equipped with a thermostatic chamber)
Shape of a test piece: A single notched test piece (a thickness of 4 mm, a width of 10 mm and a length of 80 mm)
Notch shape: Type A notch (a notch radius of 0.25 mm)
Impact speed: 2.9 m/s
Nominal pendulum energy: 4 J
Preparation method of a test piece: By cutting a notch to an injection molded test piece (in accordance with ISO 2818)
Sample conditioning: To be held in a temperature-controlled room, adjusted at room temperature 23° C. and a humidity of 50%, for 24 hours or longer
Test room: A temperature-controlled room adjusted at room temperature 23° C. and a humidity of 50%
Number of a test piece: n=5
Test temperature: 23° C.
Evaluation item: Absorption energy I. A Production Example of the Component (Z)

Production Example Z-1

(i) Production of the Solid Catalyst Component (a)

Into a reactor with an inner volume of 50 L, equipped with a stirrer, after purging with nitrogen, 20 L of dehydrated and deoxidized n-heptane was introduced, and then 10 moles of magnesium chloride and 20 moles of tetrabutoxytitanium were introduced for a reaction at 95° C. for 2 hours, followed by lowering temperature to 40° C., introduction of 12 L of methylhydropolysiloxane (a viscosity of 20 centistokes) and further reaction for 3 hours, and then a reaction solution was taken out and a solid component generated was washed with n-heptane.

Subsequently, by using the reactor equipped with a stirrer, 5 L of dehydrated and deoxidized n-heptane was introduced into the reactor, and then the solid component synthesized above was introduced in an amount of 3 mol, in a magnesium atom equivalent. Then, into 2.5 L of n-heptane, 5 mole of silicon tetrachloride was mixed and introduced at 30° C. over 30 minutes, followed by raising temperature up to 70° C., for further reaction for 3 hours, and then a reaction solution was taken out and a solid component generated was washed with n-heptane.

Still more, subsequently, by using the reactor equipped with a stirrer, 2.5 L of dehydrated and deoxidized n-heptane was introduced into the reactor, and then 0.3 mole of phthalic acid chloride was mixed and introduced at 90° C. over 30 minutes, followed by reaction at 95° C. for 1 hour. After completion of the reaction, it was washed with n-heptane. Then 2 L of titanium tetrachloride was added at room temperature for a reaction for hours, after raising temperature up to 100° C. After completion of the reaction, it was washed with n-heptane. Still more, 0.6 L of silicon tetrachloride and 8 L of n-heptane were introduced for a reaction at 90° C. for 1 hour, and sufficient washing with n-heptane to obtain a solid component. In this solid component, 1.30% by weight of titanium was contained.

Then, into the reactor equipped with a stirrer, after purging with nitrogen, 8 L of n-heptane, 400 g of the solid component obtained in the above, 0.27 mol of t-butyl-methyl-dimethoxysilane and 0.27 mol of vinyltrimethylsilane were introduced, and contacted each other at 30° C. for 1 hour. Then it was cooled to 15° C., and 1.5 mol of triethylaluminum diluted with n-heptane was introduced under condition of 15° C. over 30 minutes, then it was raised up to 30° C. for a reaction for 2 hours. A reaction solution was taken out and washed with n-heptane to obtain 390 g of the solid catalyst component (a).

In the resulting solid catalyst component (a), 1.22% by weight of titanium was contained.

Still more, 6 L of n-heptane, and 1 mol of triisobutylaluminum diluted with n-heptane were introduced under condition of 15° C. over 30 minutes, followed by introduction of propylene in a rate of about 0.4 kg/hr, for 1 hour, under control of not over 20° C., to execute preliminary polymerization.

As a result, the solid catalyst component (a) containing polypropylene was obtained, where 0.9 g of propylene was polymerized per 1 g of the solid.

(ii) Production of a Propylene-Based Block Copolymer
[A Preceding Polymerization Step: Production of a Crystalline Propylene Polymer Component]

Polymerization was executed by using a continuous reaction apparatus made by connection of two fluidized-bed type reactors with an inner volume of 230 L.

Firstly, in the first reactor, the crystalline propylene polymer component was produced by continuously supplying hydrogen, as a molecular weight controller, to achieve a molar ratio, hydrogen/propylene, of 0.040, at a polymerization temperature of 75° C., and a propylene partial pressure of 18 kg/cm$^2$ (absolute pressure), as well as supplying triethylaluminum in a rate of 5.25 g/hr, and the above catalyst, as the solid catalyst component (a), to achieve a polymer polymerization rate of 20 kg/hr.

Powder (the crystalline propylene polymer component) polymerized in the first reactor was continuously discharged to achieve a powder possessing amount in the reactor of 60 kg, and continuously transferred to the second reactor.

[A Latter Polymerization Step: Production of the Propylene-Ethylene Random Copolymer Random Component]

Subsequently, the propylene-ethylene random copolymer component was produced by continuously supplying propylene and ethylene in a molar ratio, ethylene/propylene, of 0.40, to achieve a pressure in the second reactor of 2.0 MPa at a polymerization temperature of 80° C., and further continuously supplying hydrogen, as a molecular weight controller, to achieve a molar ratio, hydrogen/(propylene+ethylene), of 0.0070, as well as supplying ethyl alcohol, as an active hydrogen compound, to achieve 1.5 times mole to triethylaluminum.

Powder (the propylene block polymer composed of the crystalline propylene polymer component and the propylene-ethylene random copolymer component) obtained after completion of polymerization in the second reactor, was continuously discharged to a vessel, to achieve a powder possessing amount in the reactor of 40 kg. The reaction was terminated by supplying nitrogen gas containing moisture, to obtain the propylene-based block copolymer.

Production Example Z-2

The propylene-based block copolymer was produced according to Production Example 1, by using a catalyst and a polymerization method used in Production Example Z-1, except by changing molar ratio of hydrogen/propylene in the preceding stage polymerization step to 0.060, molar ratio of hydrogen/(propylene+ethylene) in the latter stage polymerization step to 0.0135, and ethyl alcohol to 1.4 times mol to triethylaluminum.

II. A Production Example of the Component (M)

Production Example M-1

Example (1) Synthesis of rac-dichloro[1,1'-dimethylsilylenebis{2-(5-methyl-2-furyl)-4-phenyl-indenyl}]hafnium:
(1-a) Synthesis of dimethylbis{2-(2-(5-methyl)-furyl)-4-phenyl-indenyl}silane:

Synthesis was executed according to a method described in Example 1 of JP-A-2004-124044.
(1-b) Synthesis of rac-dichloro[1,1'-dimethylsilylenebis{2-(5-methyl-2-furyl)-4-phenyl-indenyl}]hafnium:

Into 100 mL glass reactor, 5.3 g (8.8 mmol) of dimethylbis{2-(2-(5-methyl)-furyl)-4-phenyl-indenyl}silane, and 150 mL of diethyl ether were added, and cooled to −70° C., in a dry ice-methanol bath. Into this solution, 12 mL (18 mmol) of a 1.50 mol/L n-butyllithium-hexane solution was dropped. After the dropping, the solution was returned to room temperature and stirred for 16 hours. The solvent of the reaction solution was concentrated under reduced pressure to about 20 mL, and 200 mL of toluene was added and cooled to −70° C., in a dry ice-methanol bath. Into this solution, 2.8 g (8.7 mmol) of hafnium tetrachloride was added. After that, the solution was stirred for 3 days while gradually returning to room temperature.

The solvent was removed under reduced pressure and executed recrystallization with dichloromethane/hexane to obtain 2.9 g (yield: 39%) of a racemic form (a purity of 99% or higher) of dichloro[1,1'-dimethylsilylenebis{2-(5-methyl-2-furyl)-4-phenyl-indenyl}]hafnium, as yellowish orange crystal.

Identification values of the resulting racemic form, with proton NMR method ($^1$H-NMR), are shown below.

[$^1$H-NMR(CDCl$_3$) identification result]

The racemic form: δ1.12 (s, 6H), δ2.42 (s, 6H), δ6.06 (d, 2H), δ6.24 (d, 2H), δ6.78 (dd, 2H), δ6.97 (d, 2H), δ6.96 (s, 2H), δ7.25 to δ7.64 (m, 12H)

(2) [Synthesis of a Catalyst]:
(2-1) Chemical Treatment of the Ion-Exchange Layered Silicate Into 3456 g of distilled water in a separable flask, 96% sulfuric acid (1044 g) was added and then 600 g of montmorilonite (Benclay SL, manufactured by Mizusawa Industrial Chemicals Ltd.: an average particle size of 19 μm) was added as a layered silicate. This slurry was heated up to 90° C., over 1 hour, at a rate of 0.5° C./min., for a reaction at 90° C. for 120 minutes. This reaction slurry was cooled to room temperature over 1 hour, and after the addition of 2400 g of distilled water, the slurry was filtered to obtain 1230 g of a cake-like solid.

Then, into the separable flask, 648 g of lithium sulfate and 1800 g of distilled water were added to make an aqueous solution of lithium sulfate, and all amount of the above cake-like solid was charged thereto, and 522 g of distilled water was added further. This slurry was heated up to 90° C. at a rate of 0.5° C./minute over 1 hour, for a reaction at 90° C. for 120 minutes. This reaction slurry was cooled to room temperature over 1 hour, and after the addition of 1980 g of distilled water, the slurry was filtered and washed with distilled water further to ph=3, and filtrated to obtain 1150 g of the cake-like solid.

The resulting solid was dried preliminary at 130° C. under nitrogen gas stream for 2 days, and then coarse particles with a size of 53 μm or larger were removed, and by further drying with a rotary kiln under condition of 215° C. under nitrogen gas stream and a residence time of 10 minutes, 340 g of chemically treated smectite was obtained.

Composition of this chemically treated smectite was Al: 7.81% by weight, Si: 36.63% by weight, Mg: 1.27% by weight, Fe: 1.82% by weight, Li: 0.20% by weight, and Al/Si=0.222 [mol/mol].

(2-2) Preparation of a Catalyst and Preliminary Polymerization

Into a three-necked flask (a volume of 1 L), 20 g of the chemically treated smectite obtained in the above was charged, and heptane (114 mL) was added to make a slurry, and triethylaluminum (50 mmol: 81 mL of a heptane solution with a concentration of 71 mg/ml) was added thereto and stirred for 1 hour, then washed with heptane to 1/1000, and heptane was added to get a total volume of 200 mL.

In addition, into heptane (85 mL), in an another flask (a volume of 200 mL), rac-dichloro[1,1'-dimethylsilylenebis{2-(5-methyl-2-furyl)-4-phenyl-indenyl}]hafnium (0.3 mmol) was added to make a slurry, and then triisobutylaluminum (0.6 mmol: 0.85 mL of a heptane solution with a concentration of 140 mg/ml) was added thereto for a reaction under stirring at room temperature for 45 minutes. This solution was added to the 1 L flask charged with the chemically treated smectite, and stirred at room temperature for 45 minutes. Then, 214 mL of heptane was added, and this slurry was introduced into a 1-L autoclave.

After setting inner temperature of the autoclave at 40° C., propylene was fed in a rate of 20 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, heptane was added again for decantation to wash the catalyst for preliminary polymerization. To the residual portion after the decantation, triisobutylaluminum (12 mmol: 17 mL of a heptane solution with a concentration of 140 mg/ml) was added and stirred for 10 minutes. By drying this solid for 2 hours under reduced pressure, 47.6 g of a dried catalyst for preliminary polymerization was obtained. Ratio of preliminary polymerization (value obtained by dividing polymer amount obtained by preliminary polymerization with amount of solid catalyst) was 1.38.

(3) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 200 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 7 g of a polymer after the first step was recovered from the autoclave replaced with nitrogen, and analyzed.

Polymerization in the Second Step:

After keeping the above autoclave replaced with nitrogen at 50° C. under atmospheric pressure, propylene was added up to a partial pressure of 1.0 MPa and the ethylene was added up to a partial pressure of 1.0 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 53.4%.

After 2 hours, unreacted mixed gas of ethylene/propylene was purged to terminate the polymerization. In this way, 275 g of a polymer was obtained.

A part of the resulting sample was melt kneaded under the following condition, using a "Labo Plast Mill" (model 50C150), manufactured by Toyo Seiki Co., Ltd.

Polymer: 42 g (added with 1.0 part of IRGASTAB FS210FF, manufactured by Nihon Ciba-Geigy K. K., and 0.5 g of hydrotalcite)
Temperature: 170° C.
Rotation speed: 70 rpm
Time: 3 minutes Using the obtained sample, elongational viscosity and melt tension were measured by the measurement method 1.

Value of the degree of strain hardening $\lambda$ max of this sample is 5.1, and thus it is considered that a copolymer having a branched structure is generated.

Production Example M-2

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C. Then, 210 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 12 g of a polymer after the first step was recovered from the autoclave replaced with nitrogen, and analyzed.

Polymerization in the Second Step:

After keeping the above autoclave replaced with nitrogen, at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 72.5%.

After 2 hours, unreacted mixed gas of ethylene/propylene was purged to terminate the polymerization. In this way, 211 g of a polymer was obtained.

This sample was melt kneaded similarly as in Production Example M-1, to execute property evaluation. Value of the degree of strain hardening λ max of this sample is 2.5, and thus it is considered that a copolymer having a branched structure is generated.

Production Example M-3

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 16 g of ethylene and 750 g of liquid propylene, it was heated up to 70° C. Then, 100 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 15.6 g of a polymer after the first step was recovered from the autoclave replaced with nitrogen, and analyzed.

Polymerization in the Second Step:

After keeping the above autoclave replaced with nitrogen, at 50° C. under atmospheric pressure, propylene was added up to a partial pressure of 1.0 MPa and the ethylene was added up to a partial pressure of 1.0 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 57.6%.

After 2 hours, unreacted mixed gas of ethylene/propylene was purged to terminate the polymerization. In this way, 445 g of a polymer was obtained.

Production Example M-4

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 48 g of ethylene and 750 g of liquid propylene, it was heated up to 70° C. Then, 210 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 7.5 g of a polymer after the first step was recovered from the autoclave replaced with nitrogen, and analyzed.

Polymerization in the Second Step:

After keeping the above autoclave replaced with nitrogen, at 50° C. under atmospheric pressure, propylene was added up to a partial pressure of 1.0 MPa and the ethylene was added up to a partial pressure of 1.0 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 55.6%.

After 2 hours, unreacted mixed gas of ethylene/propylene was purged to terminate the polymerization. In this way, 399 g of a polymer was obtained.

Production Example M-5

Comparative Example (1) Synthesis of rac-dichloro[1,1'-dimethylsilylenebis{2-(5-methyl-2-furyl)-4-phenyl-indenyl}]zirconium:

It was synthesized according to a method described in JP-A-2004-2259.

(2) [Synthesis of a Catalyst]:

Into a three-necked flask (a volume of 1 L), 20 g of the silica-supported MAO (product name: MAO-S, manufactured by WITCO Co., Ltd.) was charged, and heptane (200 mL) was added to make a slurry.

In addition, into heptane (85 mL), in an another flask (a volume of 200 mL), rac-dichloro[1,1'-dimethylsilylenebis{2-(5-methyl-2-furyl)-4-phenyl-indenyl}]zirconium (0.3 mmol) was added to make a slurry, and then triisobutylaluminum (0.6 mmol: 0.85 mL of a heptane solution with a concentration of 140 mg/ml) was added thereto for a reaction under stirring at room temperature for 30 minutes. This solution was added to the 1 L flask charged with MAO supported on silica, and stirred at room temperature for 30 minutes. Then, 215 mL of heptane was added, and this slurry was introduced into a 1-L autoclave.

After setting inner temperature of the autoclave at 40° C., propylene was fed in a rate of 20 g/hr, and maintained at 40° C. for 2 hours to execute preliminary polymerization. Then, propylene feed was stopped to execute post polymerization for 0.5 hour. After the supernatant of the resulting catalyst slurry was removed by decantation, triisobutylaluminum (12 mmol: 17 mL of a heptane solution with a concentration of 140 mg/ml) was added and stirred for 10 minutes. By drying this solid for 2 hours under reduced pressure, 55.6 g of a dried catalyst for preliminary polymerization was obtained. Ratio of preliminary polymerization (value obtained by dividing polymer amount obtained by preliminary polymerization with amount of solid catalyst) was 1.78.

(3) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 200 mL of hydrogen and 500 g of liquid propylene, it was heated up to 70° C. Then, 300 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 30 g of a polymer after the first step was recovered from the autoclave replaced with nitrogen, and analyzed.

Polymerization in the Second Step:

After keeping the above autoclave replaced with nitrogen at 50° C. under atmospheric pressure, propylene was added up to a partial pressure of 0.3 MPa and the ethylene was added up to a partial pressure of 1.2 MPa quickly, to initiate polymerization in the second step. During the polymerization, a total pressure 1.5 MPa was maintained at 50° C., by introducing mixed gas of ethylene/propylene, adjusted in advance to achieve constant composition.

Average gas composition of this polymerization in the second step was C2: 80.0%.

After 2 hours, unreacted mixed gas of ethylene/propylene was purged to terminate the polymerization. In this way, 350.5 g of a polymer was obtained.

Production Example M-6

Example (1) [Synthesis of a Catalyst]
(1-1) Preparation of a Catalyst and Preliminary Polymerization:

Into a three-necked flask (a volume of 1 L), 10 g of the resulting chemically treated smectite was charged, and heptane (66 mL) was added to make a slurry, and triethylaluminum (24 mmol: 34 mL of a heptane solution with a concentration of 140 mg/ml) was added thereto and stirred for 1 hour, then washed with heptane to 1/1000, and heptane was added to achieve a total volume of 100 mL.

In addition, in an another flask (a volume of 200 mL), rac-dichloro[1,1'-dimethylsilylenebis{2-(5-methyl-2-furyl)-4-phenyl-indenyl}]hafnium (0.30 mmol) was dissolved to toluene (43 mL).

Triisobutylaluminum (0.6 mmol: 0.85 mL of a heptane solution with a concentration of 140 mg/ml) was added to the 1 L flask charged with the chemically treated smectite, and the above complex solution was added further and stirred at room temperature for 60 minutes. Then, 356 mL of heptane was added, and this slurry was introduced into a 1-L autoclave.

After setting inner temperature of the autoclave at 40° C., propylene was fed in a rate of 10 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, triisobutylaluminum (12 mmol: 8.5 mL of a heptane solution with a concentration of 140 mg/ml) was added and stirred for 10 minutes. By drying this solid for 2 hours under reduced pressure, 26.1 g of a dried catalyst for preliminary polymerization was obtained. Ratio of preliminary polymerization (value obtained by dividing polymer amount obtained by preliminary polymerization with amount of solid catalyst) was 1.61.

(2) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 300 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 20 g of a polymer after the first step was recovered from the autoclave replaced with nitrogen, and analyzed.

Polymerization in the Second Step:

After keeping the above autoclave replaced with nitrogen, at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 80.7%.

After 50 minutes, unreacted mixed gas of ethylene/propylene was purged to terminate the polymerization. In this way, 193 g of a polymer was obtained.

A part of the resulting sample was melt kneaded under the following condition, using a "Labo Plast Mill" (model 50C150), manufactured by Toyo Seiki Co., Ltd.

Polymer: 42 g (added with 0.125 part of Irganox 1010, and 0.125 part of Irgafos 168, manufactured by Nihon Ciba-Geigy K. K., and 0.125 g of calcium stearate)

Temperature: 190° C.
Rotation speed: 70 rpm
Time: 3 minutes

Using the resulting sample, elongational viscosity was measured by the measurement method 1. Value of the degree of strain hardening λ max of this sample is 2.4, and thus it is considered that a copolymer having a branched structure is generated.

Production Example M-7

Example (1) Preparation of a Catalyst and Preliminary Polymerization:

Into a three-necked flask (a volume of 1 L), 20 g of the resulting chemically treated smectite was charged, and heptane (132 mL) was added to make a slurry, and isobutylaluminum (50 mmol: 70 mL of a heptane solution with a concentration of 140 mg/ml) was added thereto and stirred for 1 hour, then washed with heptane to 1/1000, and heptane was added to achieve a total volume of 200 mL.

In addition, in an another flask (a volume of 200 mL), rac-dichloro[1,1'-dimethylsilylenebis{2-(5-methyl-2-furyl)-4-phenyl-indenyl}]hafnium (0.30 mmol) was dissolved to toluene (86 mL).

Triisobutylaluminum (0.6 mmol: 0.85 mL of a heptane solution with a concentration of 140 mg/ml) was added to the 1 L flask charged with the chemically treated smectite, and the above complex solution was added further and stirred at room temperature for 60 minutes. Then, 213 mL of heptane was added, and this slurry was introduced into a 1 L autoclave.

After setting inner temperature of the autoclave at 40° C., propylene was fed in a rate of 10 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, triisobutylaluminum (12 mmol: 17 mL of a heptane solution with a concentration of 140 mg/ml) was added and stirred for 10 minutes. By drying this solid for 2 hours under reduced pressure, 51.4 g of a dried catalyst for preliminary polymerization was obtained. Ratio of preliminary polymerization (value obtained by dividing polymer amount obtained by preliminary polymerization with amount of solid catalyst) was 1.57.

(2) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 250 mg of the catalyst for preliminary polymerization prepared above, as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 20 g of a polymer after the first step was recovered from the autoclave replaced with nitrogen, and analyzed.

Polymerization in the Second Step:

After keeping the above autoclave replaced with nitrogen at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 79.6%.

After 30 minutes, unreacted mixed gas of ethylene/propylene was purged to terminate the polymerization. In this way, 250 g of a polymer was obtained.

This sample was melt kneaded similarly as in Production Example M-1, to execute property evaluation. Value of the degree of strain hardening λ max of this sample is 2.2, and thus it is considered that a copolymer having a branched structure is generated.

Production Example M-8

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 400 mg of the catalyst for preliminary polymerization prepared in [Production Example M-1], as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 11 g of a polymer after the first step was recovered from the autoclave replaced with nitrogen, and analyzed.

Polymerization in the Second Step:

After keeping the above autoclave replaced with nitrogen, at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 79.6%.

After 40 minutes, unreacted mixed gas of ethylene/propylene was purged to terminate the polymerization. In this way, 193 g of a polymer was obtained.

This sample was melt kneaded similarly as in Production Example M-1, to execute property evaluation. Value of the degree of strain hardening λ max of this sample is 2.5, and thus it is considered that a copolymer having a branched structure is generated.

Production Example M-9

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 170 mg of the catalyst for preliminary polymerization prepared in [Production Example M-2], as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 22 g of a polymer after the first step was recovered from the autoclave replaced with nitrogen, and analyzed.

Polymerization in the Second Step:

After keeping the above autoclave replaced with nitrogen, at 70° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 70° C., by introducing mixed gas of ethylene/propylene, adjusted in advance to achieve constant composition.

Average gas composition of this polymerization in the second step was C2: 77.6%. After 60 minutes, unreacted mixed gas of ethylene/propylene was purged to terminate the polymerization. In this way, 164 g of a polymer was obtained.

This sample was melt kneaded similarly as in Production Example M-1, to execute property evaluation. Value of the degree of strain hardening λ max of this sample is 2.9, and thus it is considered that a copolymer having a branched structure is generated.

Production Example M-10

Example (1) [Polymerization]
Polymerization in the First Step:
A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 75° C.

Then, 250 mg of the catalyst for preliminary polymerization prepared in [Production Example M-2], as weight excluding a preliminarily polymerized polymer, was transferred under pressure to the polymerization reactor with high pressure argon to initiate polymerization. After keeping at 75° C. for 1 hour, unreacted propylene was quickly purged, and by replacing inside the autoclave with nitrogen, polymerization in the first step was terminated.

By using a Teflon (registered trade name) tube, 24 g of a polymer after the first step was recovered from the autoclave replaced with nitrogen, and analyzed.
Polymerization in the Second Step:
After keeping the above autoclave replaced with nitrogen, at 70° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 70° C., by introducing mixed gas of ethylene/propylene, adjusted in advance to achieve constant composition.

Average gas composition of this polymerization in the second step was C2: 80.1%. After 50 minutes, unreacted mixed gas of ethylene/propylene was purged to terminate the polymerization. In this way, 174 g of a polymer was obtained.

This sample was melt kneaded similarly as in Production Example M-1, to execute property evaluation. Value of the degree of strain hardening λ max of this sample is 2.5, and thus it is considered that a copolymer having a branched structure is generated.

Production Example M-11

Example (1) Synthesis of rac-dichloro[1,1'-dimethylsilylenebis{2-methyl-4-(4-chlorophenyl)-4-hydroazulenyl}]hafnium:
Synthesis of rac-dichloro[1,1'-dimethylsilylenebis{2-methyl-4-(4-chlorophenyl)-4-hydroazulenyl}]hafnium, was executed similarly as in Example 1 of JP-A-11-240909.
(2) Preparation of a Catalyst and Preliminary Polymerization:
Into a three-necked flask (a volume of 1 L), 10 g of the resulting chemically treated smectite obtained as above was charged, and heptane (66 mL) was added to make a slurry, and triisobutylaluminum (24 mmol: 34 mL of a heptane solution with a concentration of 140 mg/ml) was added thereto and stirred for 1 hour, then washed with heptane to 1/1000, and heptane was added to achieve a total volume of 100 mL.

In addition, in an another flask (a volume of 200 mL), rac-dichloro[1,1'-dimethylsilylenebis{2-(5-methyl-2-furyl)-4-phenyl-indenyl}]hafnium (0.135 mmol), synthesized in Production Example M-1 (Example), was dissolved to toluene (38 mL) (a complex solution 1).

In addition, in an another flask (a volume of 200 mL), rac-dichloro[1,1'-dimethylsilylenebis{2-methyl-4-(4-chlorophenyl)-4-hydroazulenyl}]hafnium (0.015 mmol), synthesized above, was dissolved to toluene (5 mL) (a complex solution 2).

Triisobutylaluminum (0.6 mmol: 0.85 mL of a heptane solution with a concentration of 140 mg/ml) was added to the 1 L flask charged with the chemically treated smectite, and the above complex solution 1 was added further, subsequently the above complex solution 2 was added, and stirred at room temperature for 60 minutes. Then, 356 mL of heptane was added, and this slurry was introduced into a 1 L autoclave.

After setting inner temperature of the autoclave at 40° C., propylene was fed in a rate of 10 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, triisobutylaluminum (12 mmol: 8.5 mL of a heptane solution with a concentration of 140 mg/ml) was added and stirred for 10 minutes. By drying this solid for 2 hours under reduced pressure, 26.1 g of a dried catalyst for preliminary polymerization was obtained. Ratio of preliminary polymerization (value obtained by dividing polymer amount obtained by preliminary polymerization with amount of solid catalyst) was 1.84.
(3) [Polymerization]
Polymerization in the First Step:
A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 450 NmL of hydrogen and 750 g of liquid propylene, it was heated up to 75° C.

Then, 100 mg of the catalyst for preliminary polymerization prepared above, as weight excluding a preliminarily polymerized polymer, was transferred under pressure to the polymerization reactor with high pressure argon to initiate polymerization. After keeping at 75° C. for 1 hour, unreacted propylene was quickly purged, and by replacing inside the autoclave with nitrogen, polymerization in the first step was terminated.

By using a Teflon (registered trade name) tube, 34 g of a polymer after the first step was recovered from the autoclave replaced with nitrogen, and analyzed.
Polymerization in the Second Step:
After keeping the above autoclave replaced with nitrogen, at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 80.1%. After 50 minutes, unreacted mixed gas of ethylene/propylene was purged to terminate the polymerization. In this way, 386 g of a polymer was obtained.

Production Example M-12

Example (1) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 300 NmL of hydrogen and 750 g of liquid propylene, it was heated up to 75° C.

Then, 150 mg of the catalyst for preliminary polymerization, prepared in Production Example M-11 (Example), as weight excluding a preliminarily polymerized polymer, was transferred under pressure to the polymerization reactor with high pressure argon to initiate polymerization. After keeping at 75° C. for 1 hour, unreacted propylene was quickly purged, and by replacing inside the autoclave with nitrogen, polymerization in the first step was terminated.

By using a Teflon (registered trade name) tube, 22 g of a polymer after the first step was recovered from the autoclave replaced with nitrogen, and analyzed.
Polymerization in the Second Step:

After keeping the above autoclave replaced with nitrogen, at 60° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 60° C., by introducing mixed gas of ethylene/propylene, adjusted in advance to achieve constant composition.

Average gas composition of this polymerization in the second step was C2: 81.7%. After 50 minutes, unreacted mixed gas of ethylene/propylene was purged to terminate the polymerization. In this way, 330 g of a polymer was obtained.

Production Example M-13

Example (1) Synthesis of rac-dichloro[1,1'-dimethylsilylenebis{2-ethyl-4-(2-fluoro-4-biphenyl)-4-hydroazulenyl}]hafnium:
Synthesis of rac-dichloro[1,1'-dimethylsilylenebis{2-ethyl-4-(2-fluoro-4-biphenyl)-4-hydroazulenyl}]hafnium was executed similarly as in Example 3 of JP-B-3830370.
(2) Preparation of a Catalyst and Preliminary Polymerization:

Into a three-necked flask (a volume of 1 L), 10 g of the resulting chemically treated smectite was charged, and heptane (66 mL) was added to make a slurry, and triisobutylaluminum (24 mmol: 34 mL of a heptane solution with a concentration of 140 mg/ml) was added thereto and stirred for 1 hour, then washed with heptane to 1/1000, and heptane was added to achieve a total volume of 100 mL.

In addition, in an another flask (a volume of 200 mL), rac-dichloro[1,1'-dimethylsilylenebis{2-(5-methyl-2-furyl)-4-phenyl-indenyl}]hafnium (0.105 mmol), synthesized in Production Example M-1 (Example), was dissolved to toluene (30 mL) (a complex solution 3).

In addition, in an another flask (a volume of 200 mL), rac-dichloro[1,1'-dimethylsilylenebis{2-ethyl-4-(2-fluoro-4-biphenyl)-4-hydroazulenyl}]hafnium (0.045 mmol), synthesized above, was dissolved to toluene (13 mL)(a complex solution 4).

Triisobutylaluminum (0.6 mmol: 0.85 mL of a heptane solution with a concentration of 140 mg/ml) was added to the 1 L flask charged with the chemically treated smectite, and the above complex solution 3 was added further, subsequently the above complex solution 4 was added, and stirred at room temperature for 60 minutes. Then, 356 mL of heptane was added, and this slurry was introduced into a 1 L autoclave.

After setting inner temperature of the autoclave at 40° C., propylene was fed in a rate of 10 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, triisobutylaluminum (12 mmol: 8.5 mL of a heptane solution with a concentration of 140 mg/ml) was added and stirred for 10 minutes. By drying this solid for 2 hours under reduced pressure, 26.1 g of a dried catalyst for preliminary polymerization was obtained. Ratio of preliminary polymerization (value obtained by dividing polymer amount obtained by preliminary polymerization with amount of solid catalyst) was 2.08.
(3) [Polymerization]
Polymerization in the First Step:

A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 430 NmL of hydrogen and 750 g of liquid propylene, it was heated up to 75° C.

Then, 100 mg of the catalyst for preliminary polymerization prepared above, as weight excluding a preliminarily polymerized polymer, was transferred under pressure to the polymerization reactor with high pressure argon to initiate polymerization. After keeping at 75° C. for 1 hour, unreacted propylene was quickly purged, and by replacing inside the autoclave with nitrogen, polymerization in the first step was terminated.

By using a Teflon (registered trade name) tube, 34 g of a polymer after the first step was recovered from the autoclave replaced with nitrogen, and analyzed.
Polymerization in the Second Step:

After keeping the above autoclave replaced with nitrogen, at 50° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 50° C., by introducing mixed gas of ethylene/propylene, adjusted in advance to achieve constant composition.

Average gas composition of this polymerization in the second step was C2: 84.2%. After 50 minutes, unreacted mixed gas of ethylene/propylene was purged to terminate the polymerization. In this way, 380 g of a polymer was obtained.

Production Example M-14

Comparative Example (1) Preparation of a Catalyst and Preliminary Polymerization:
Into a three-necked flask (a volume of 1 L), 10 g of the resulting chemically treated smectite was charged, and heptane (66 mL) was added to make a slurry, and triethylaluminum (24 mmol: 34 mL of a heptane solution with a concentration of 140 mg/ml) was added thereto and stirred for 1 hour, then washed with heptane to 1/1000, and heptane was added to achieve a total volume of 100 mL.

In addition, in an another flask (a volume of 200 mL), rac-dichloro[1,1'-dimethylsilylenebis{2-methyl-4-(4-chlorophenyl)-4-hydroazulenyl}]hafnium (0.30 mmol), synthesized in accordance with a method described in JP-A-11-240909, was dissolved to toluene (43 mL) and stirred. Triisobutylaluminum (0.6 mmol: 0.85 mL of a heptane solution with a concentration of 140 mg/ml) was added to the 1 L flask charged with the chemically treated smectite, and the above complex solution was added further and stirred at room temperature for 60 minutes. Then, 356 mL of heptane was added, and this slurry was introduced into a 1 L autoclave.

After setting inner temperature of the autoclave at 40° C., propylene was fed in a rate of 10 g/hr, and maintained at 40° C. for 2 hours to execute preliminary polymerization. Then, propylene feed was stopped to execute post polymerization at 50° C. for 0.5 hour. After the supernatant of the resulting catalyst slurry was removed by decantation, triisobutylaluminum (12 mmol: 17 mL of a heptane solution with a concentration of 140 mg/ml) was added and stirred for 10 minutes. By drying this solid for 2 hours under reduced pressure, 30.5 g of a dried catalyst for preliminary polymerization was obtained. Ratio of preliminary polymerization (value obtained by dividing polymer amount obtained by preliminary polymerization with amount of solid catalyst) was 2.05.

(2) [Polymerization]
Polymerization in the First Step:
A 3 L autoclave was sufficiently dried in advance, by passing nitrogen under heating, and then inside of the reactor was purged with propylene and cooled to room temperature. 2.86 mL of a heptanes solution of triisobutylaluminum (140 mg/mL) was added thereto, and after introducing 750 g of liquid propylene, it was heated up to 70° C.

Then, 20 mg of the catalyst for preliminary polymerization [Production Example M-2], as weight excluding a preliminarily polymerized polymer, was transferred under pressure to the polymerization reactor with high pressure argon to initiate polymerization. After keeping at 70° C. for 1 hour, unreacted propylene was quickly purged, and by replacing inside the autoclave with nitrogen, polymerization in the first step was terminated.

By using a Teflon (registered trade name) tube, 14 g of a polymer after the first step was recovered from the autoclave replaced with nitrogen, and analyzed.

Polymerization in the Second Step:
After keeping the above autoclave replaced with nitrogen, at 70° C. under atmospheric pressure, propylene was added up to a partial pressure of 0.5 MPa and the ethylene was added up to a partial pressure of 1.5 MPa quickly, to initiate polymerization in the second step. During the polymerization, a total pressure 2.0 MPa was maintained at 70° C., by introducing mixed gas of ethylene/propylene, adjusted in advance to achieve constant composition.

Average gas composition of this polymerization in the second step was C2: 83.2%. After 50 minutes, unreacted mixed gas of ethylene/propylene was purged to terminate the polymerization. In this way, 291 g of a polymer was obtained.

This sample was melt kneaded similarly as in Production Example M-1, to execute property evaluation. Elongational viscosity of this sample does not exhibit strain hardening, that is value of the degree of strain hardening λ max of is 1.0, and thus it is considered that a copolymer having a branched structure is not generated.

Characteristics of resins obtained in these Production Examples are shown in Table 1 and Tables 2 to 3.

It should be noted that Vi content in Tables 2 and 3 is number of vinyl (Vi) groups positioned at polymer chain terminals, in skeleton carbon 1000 C, represents concentration of copolymerizable terminal vinyl groups, in a polymer, and is one measured by using $^{13}$C-NMR and a method described in Macromolecules, 31, 3783(1998).

TABLE 1

|  |  |  | Production Exam Z-1 | Production Exam Z-2 |
|---|---|---|---|---|
| Total | MFR | g/10 min | 25 | 50 |
|  | Ym | ° C. | 164 | 164 |
| CXIS-Z | Ratio | wt % | 78 | 80 |
|  | Ratio | wt % | 22 | 20 |
| CXS-Z | Ethylene content | wt % | 40 | 40 |

TABLE 2

|  |  |  | P.E. M-1 | P.E. M-2 | P.E. M-3 | P.E. M-4 | P.E. M-5 | P.E. M-6 | P.E. M-7 |
|---|---|---|---|---|---|---|---|---|---|
| [I] Product discharged from process | MFR | dg/min | 41.5 | 29.4 | 51.7 | 119 | 3.0 | 27.5 | 28.7 |
|  | Tm | ° C. | 153.8 | 153.7 | 141.5 | 128.0 | 154.8 | 153.8 | 153.9 |
|  | Vi content | /1000 C | 0.3 | 0.2 | 0.3 | 0.3 | 0.1 | 0.2 | 0.2 |
| Polymer in total | Mw | g/mol | 293000 | 361000 | 315000 | 186000 | 310000 | 382000 | 314000 |
|  | Q value | — | 4.2 | 4.4 | 3.9 | 3.6 | 4.0 | 5.9 | 4.9 |
|  | MFR | dg/min | 3.5 | 1.1 | 3.2 | 56.2 | 3.0 | 3.3 | 5.1 |
|  | Gel fraction | wt % | 0 | 0 | 0 | 0 | 0 | 0 | 0 |
|  | λmax (0.1/s) | — | 5.1 | 2.5 | 4.0 | 2.5 | 1.2 | 2.4 | 2.2 |
|  | ME | — | 1.88 | 1.49 | 1.99 | 1.53 | 1.35 | 1.95 | 1.93 |
| Crystal. component (CXIS) | Weight fraction | wt % | 43.8 | 63.0 | 79.2 | 92.3 | 70 | 80.9 | 83.4 |
|  | Mw | g/mol | 332000 | 369000 | 319000 | 216000 | 310000 | 387000 | 304000 |
|  | mm | % | 96.3 | 96.4 | 96.3 | 96.2 | 97.0 | 96.3 | 96.4 |
|  | λmax (0.1/s) | — | 3.4 | 2.0 | 3.3 | 2.0 | 1.2 | 2.8 | 2.5 |
|  | Ethylene content | wt % | 2.2 | 4.8 | 2.2 | 2.7 | 7.0 | 5.9 | 6.2 |
| Amorphous component (CXS) | Weight fraction | wt % | 56.2 | 37.0 | 20.8 | 7.7 | 30.0 | 19.1 | 16.6 |
|  | Mw | g/mol | 264000 | 346000 | 298000 | 269000 | 300000 | 361000 | 326000 |
|  | λmax (0.1/s) | — | 7.6 | 2.8 | 4.4 | 2.7 | 1.3 | 1.5 | 1.1 |
|  | Ethylene content | wt % | 13.4 | 32.6 | 16.0 | 14.0 | 54.0 | 48.8 | 49.9 |

(Note);
P.E.: Production Example

TABLE 3

|  |  |  | P.E. M-8 | P.E. M-9 | P.E. M-10 | P.E. M-11 | P.E. M-12 | P.E. M-13 | P.E. M-14 |
|---|---|---|---|---|---|---|---|---|---|
| [I] Product discharged from Process Polymer in total | MFR | dg/min | 31.7 | 25.9 | 125 | 195 | 43.9 | 2.9 | 76.2 |
| | Tm | °C. | 153.8 | 153.1 | 152.8 | 152.1 | 153 | 157 | 152.1 |
| | Vi content | /1000 C | 0.2 | 0.2 | 0.3 | 0.4 | 0.2 | 0.2 | 0 |
| | Mw | g/mol | 296000 | 264000 | 212000 | 123000 | 180000 | 386000 | 180000 |
| | Q value | — | 4.4 | 3.7 | 3.6 | 4.8 | 4.2 | 4.6 | 3.8 |
| | MFR | dg/min | 4.3 | 6.4 | 25.2 | 50.8 | 10.9 | 1.6 | 76.2 |
| | Gel fraction | wt % | 0 | 0 | 0 | 0 | 0 | 0 | 0 |
| | λmax (0.1/s) | — | 2.5 | 2.9 | 2.5 | 2.4 | 10.1 | 6.0 | 1.0 |
| | ME | — | 2.00 | 1.91 | 1.34 | 1.85 | 2.05 | 2.12 | 1.01 |
| Crystal. component (CXIS) | Weight fraction | wt % | 82.1 | 76.9 | 78.0 | 91.7 | 89.1 | 92.1 | 84.4 |
| | Mw | g/mol | 260000 | 281000 | 215000 | 100000 | 170000 | 370000 | 130000 |
| | mm | % | 96.3 | 96.3 | 96.5 | 96.4 | 96.3 | 96.4 | 98.8 |
| | λmax (0.1/s) | — | 2.5 | 2.9 | 3.0 | 2.5 | 10.5 | 6.5 | 1.0 |
| | Ethylene content | wt % | 7.5 | 6.5 | 6.8 | 6.9 | 6.8 | 5.5 | 0.5 |
| Amorphous component (CXS) | Weight fraction | wt % | 17.9 | 23.1 | 20.3 | 8.3 | 10.9 | 7.9 | 15.6 |
| | Mw | g/mol | 470000 | 184000 | 183000 | 427000 | 285000 | 511000 | 480000 |
| | λmax (0.1/s) | — | 1.4 | 1.4 | 1.1 | 1.3 | 1.4 | 1.9 | 1.0 |
| | Ethylene content | wt % | 58.9 | 50.1 | 50.3 | 56.3 | 55.8 | 54.2 | 47.5 |

As is clear from Tables 2 and 3, the propylene-based polymer of the present invention is constituted of a specific crystalline component (A) and an amorphous component (B), and is characterized in that (i) weight average molecular weight (Mw) measured with GPC is from 100,000 to 1,000,000, (ii) content of the component insoluble in hot p-xylene is 0.3% by weight or lower, and (iii) degree of strain hardening (λ max) in measurement of elongational viscosity is 2.0 or higher, therefore it is considered that it has excellent balance of mechanical properties, and also improved melt tension (MT) or melt fluidity, and excellent moldability and appearance.

On the other hand, the propylene-based polymers of Production Example M-5 (Comparative Example) and Production Example M-14 (Comparative Example) have, in particular, the degree of strain hardening (λ max), in measurement of elongational viscosity, of below 2.0, and specifically, 1.2 for Production Example M-5 and 1.0 for Production Example M-14, therefore it is considered that melt strength is low and mechanical properties are inferior.

Figure 2:
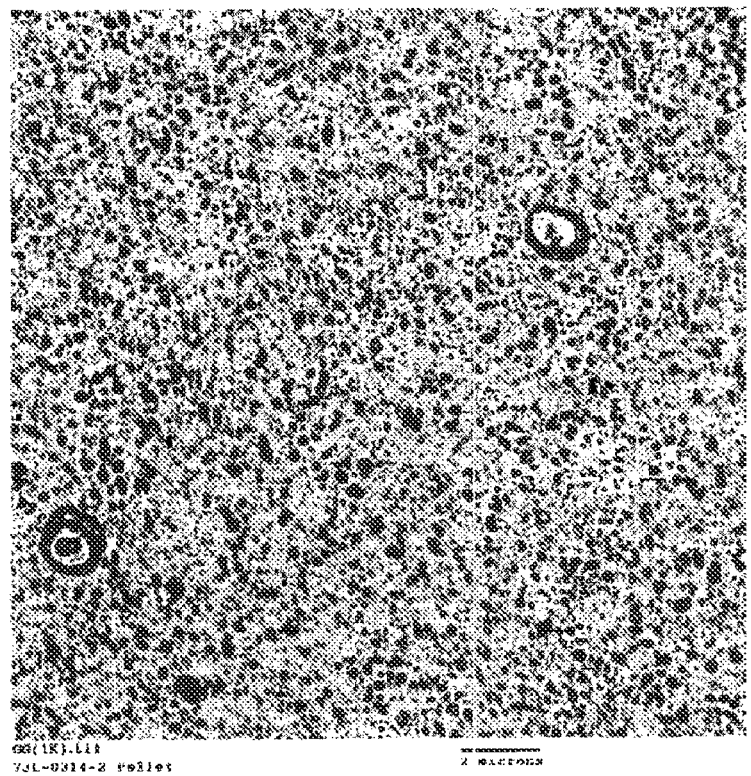
FIG. 2 is a drawing showing TEM observation result of a propylene-based polymer, in Production Example M-9 (Example) of the present invention.
Figure 2:
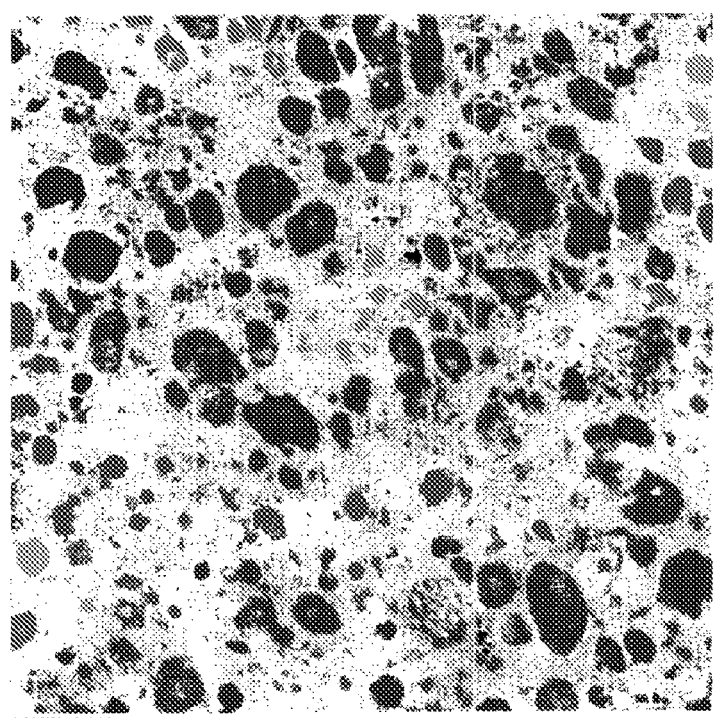
Figure 3:
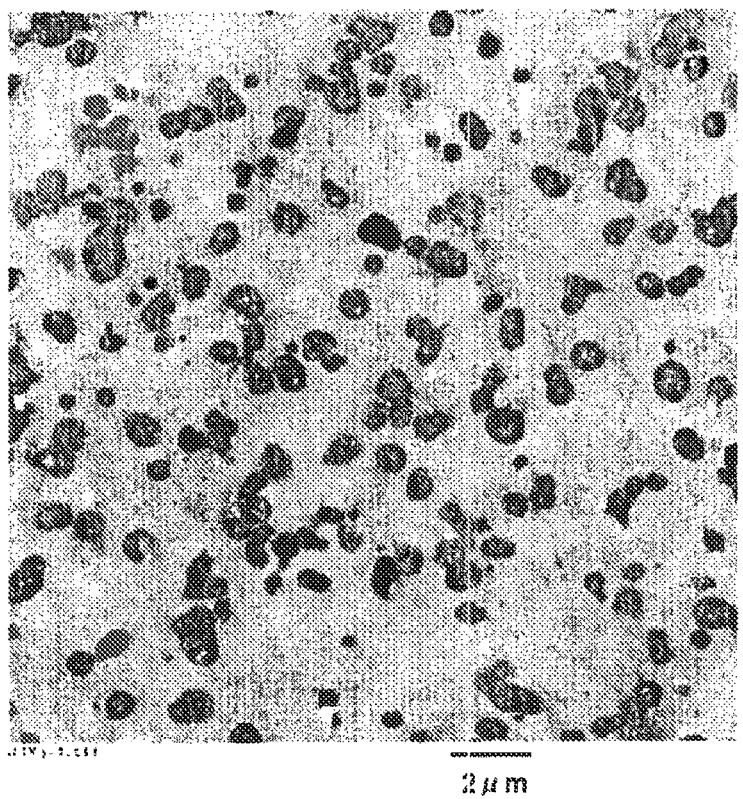
FIG. 3 is a drawing showing TEM observation result of a propylene-based polymer, in Production Example M-14 (Comparative Example) of the present invention.
Figure 3:
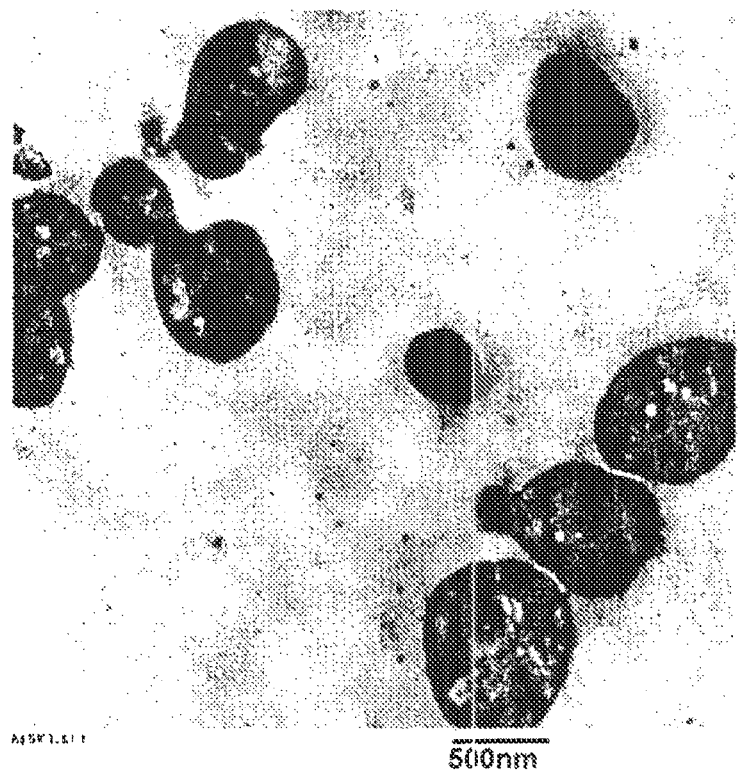

In addition, FIG. 1 and FIG. 2 show observation results of morphology of the propylene-based polymers of Production Example M-6 and Production Example M-9, with a transmission electron microscope (TEM). As shown in FIG. 1 (the polymer of Production Example M-6), an amorphous component (dark area) is very finely dispersed in a crystalline component (white area). In a magnified view, it is observed that dispersed morphology of two layers of peculiar structures is present, and still more the amorphous component is dispersed in a honeycomb state therein. This is considered to be generated by presence of a chemically bonded component of the crystalline component and the amorphous component in the polymer. As comparison, FIG. 3 shows TEM observation result of morphology of the propylene-based polymer of Production Example M-14.

Still more, Production Example M-9 (FIG. 2) is different in branching degree and molecular weight of the amorphous part, due to different polymerization condition in the second stage, as compared with Production Example M-6 (FIG. 1). As a result it can be observed that the amorphous component is dispersed in the crystalline component in further high degree, resulting in a state of further finer particle size of the amorphous part.

Examples 1 to 12 and Comparative Examples 1 to 3

Properties were evaluated on samples obtained by formulating each component of the resins obtained in the Production Examples, in ratio shown in Tables 4, 5, and pelletizing and molding under the following condition. Property evaluation results are shown in Tables 4, 5, and pelletizing condition and molding condition are shown below.

(Formulation of the Additives):

Antioxidants: 500 ppm of tetrakis{methylene-3-(3',5'-di-t-butyl-4'-hydroxyphenyl)propionate}methane, and 500 ppm of tris(2,4-di-t-butylphenyl) phosphite, and neutralization agent: 500 ppm of calcium stearate.

(Pelletizing):

Extruder: KZW-15-45MG twin-screw extruder, manufactured by Technovel Corp.

Screw: Bore diameter 15 mm, L/D=45

Extruder setting temperature: (from the bottom of a hopper) 40, 80, 160, 200, 200, 200 (die ° C.)

Screw rotation speed: 400 rpm

Output rate: Adjusted to about 1.5 kg/hr with a screw feeder

Die: Bore diameter 3 mm, strand die, number of hole 2

(Molding):

The obtained pellets were injection molded under the following condition to obtain test pieces for property evaluation.

Specification No.: JIS K7152 (ISO 294-1)

Molding machine: EC20P injection molding machine, manufactured by Toshiba Machine Co., Ltd.

Molding machine setting temperature: (from the bottom of a hopper) 80, 210, 210, 200, 200° C.

Mold temperature: 40° C.

Injection speed: 52 mm/s (screw speed)

Hold pressure: 30 MPa

Hold time: 8 s

Mold shape: A couple of flat plates (a thickness of 4 mm, a width of 10 mm and a length of 80 mm)

Figure 6:
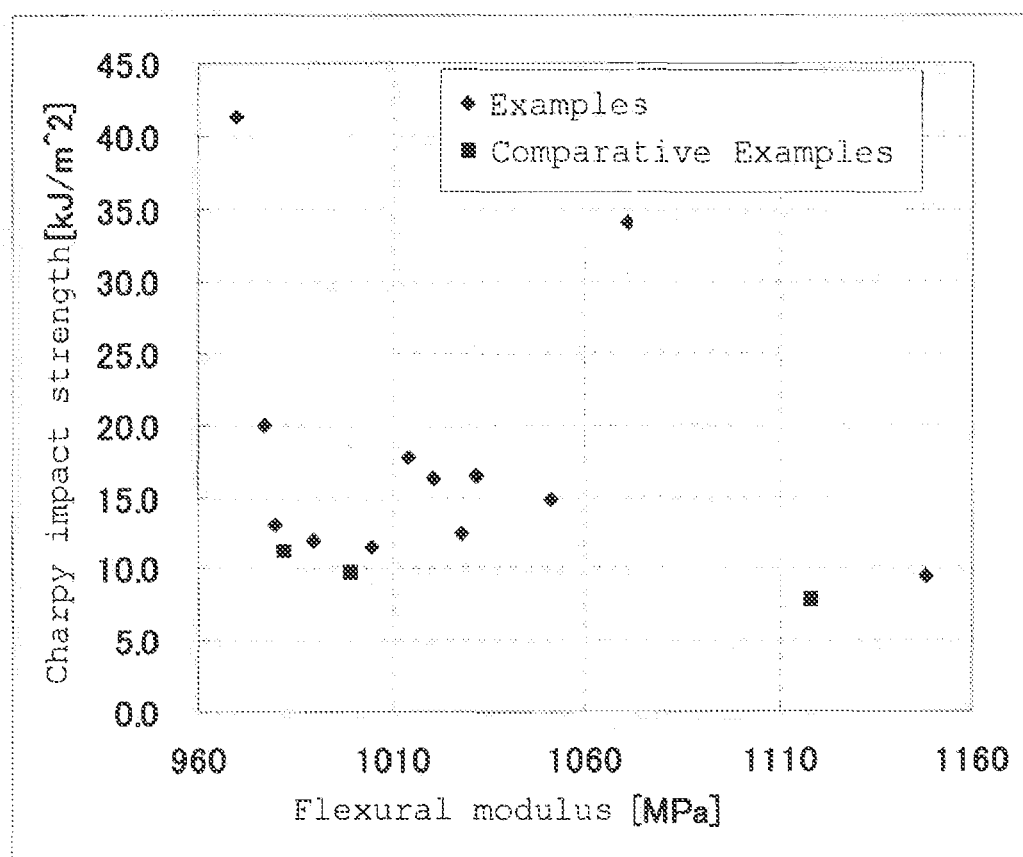
FIG. 6 is plot of rigidity-impact resistance (Charpy impact strength) of Examples and Comparative Examples of the present invention.

FIG. 6 shows a plot of Charpy impact strength vs. flexural modulus, as evaluation result.

TABLE 4

|  |  |  | Example 1 | Example 2 | Example 3 | Example 4 | Example 5 | Example 6 |
|---|---|---|---|---|---|---|---|---|
| Comp. (Z) | Kind | — | P.E. Z-1 | P.E. Z-1 | P.E. Z-1 | P.E. Z-1 | P.E. Z-1 | P.E. Z-1 |
|  | Formulation amount | wt % | 90 | 90 | 80 | 90 | 90 | 90 |
| Comp. (M) | Kind | — | P.E. M-1 | P.E. M-2 | P.E. M-2 | P.E. M-6 | P.E. M-7 | P.E. M-8 |
|  | Formulation amount | wt % | 10 | 10 | 20 | 10 | 10 | 10 |
|  | Ratio of composition (B) | wt % | 56.2 | 37 | 37 | 19.1 | 16.6 | 17.9 |
| Composition | Composition (B) in component | wt % | 5.62 | 3.7 | 7.4 | 1.91 | 1.66 | 1.79 |
|  | Flexural modulus | Mpa | 980 | 1005 | 990 | 977 | 1021 | 1014 |
|  | Charpy impact strength | kJ/m$^2$ | 13.0 | 11.5 | 120 | 20.0 | 16.2 | 17.8 |

TABLE 5

|  |  |  | Example 7 | Example 8 | Example 9 | Example 10 | Example 11 | Example 12 |
|---|---|---|---|---|---|---|---|---|
| Comp. (Z) | Kind | — | P.E. Z-1 | P.E. Z-1 | P.E. Z-1 | P.E. Z-2 | P.E. Z-1 | P.E. Z-1 |
|  | Formulation amount | wt % | 90 | 90 | 80 | 90 | 90 | 90 |
| Comp. (M) | Kind | — | P.E. M-9 | P.E. M-10 | P.E. M-10 | P.E. M-10 | P.E. M-11 | P.E. M-12 |
|  | Formulation amount | wt % | 10 | 10 | 20 | 10 | 10 | 10 |
|  | Ratio of composition (B) | wt % | 23.1 | 20.3 | 20.3 | 20.3 | 8.3 | 10.9 |
| Composition | Compsition (B) in component | wt % | 2.31 | 2.03 | 4.06 | 2.03 | 0.83 | 1.09 |
|  | Flexural modulus | Mpa | 970 | 1051 | 1071 | 1148 | 1028 | 1032 |
|  | Charpy impact strength | kJ/m$^2$ | 41.3 | 14.8 | 34.0 | 9.5 | 12.4 | 16.5 |

TABLE 6

|  |  |  | Com. Exam. 1 | Com. Exam. 2 | Com. Exam. 3 |
|---|---|---|---|---|---|
| Comp. (Z) | Kind | — | P.E. Z-1 | P.E. Z-2 | P.E. Z-1 |
|  | Formulation amount | wt % | 100 | 100 | 90 |
| Comp. (M) | Kind | — | — | — | P.E. M-14 |
|  | Formulation amount | wt % | 0 | 0 | 10 |
|  | Ratio of composition (B) | wt % | — | — | 15 |
| Composition | Composition (B) in component | wt % | 0 | 0 | 1.5 |
|  | Flexural modulus | Mpa | 982 | 1118 | 999 |
|  | Charpy impact strength | kJ/m$^2$ | 11.3 | 7.8 | 9.7 |

Com. Exam: Comparative Example

As is clear from Tables 4 and 5, and FIG. 6, the resin compositions of the present invention, shown in Examples 1 to 12, contain a copolymer having a branched structure, and contain specific amount of the specific propylene-ethylene copolymer (the component (M)), which is constituted of the specific crystalline component (A) and the amorphous component (B), therefore excellent in both flexural modulus and Charpy impact strength, and excellent in rigidity-impact resistance balance.

On the other hand, it is considered that in the resin compositions of Comparative Examples 1 and 2, the specific propylene-ethylene copolymer (the component (M)) is not contained, and in the resin composition of Comparative Example 3, the component (M), which is Production Example M-14, does not contain the copolymer having a branched structure, therefore because of not satisfying specification that degree of strain hardening (λ max), in measurement of elongational viscosity of the component (M), is 2.0 or higher, rigidity-impact resistance balance is poor, as shown in FIG. 6, as compared with Examples 1 to 12.

Reference Example

The propylene-based polymer of the present invention is characterized by containing a branched structure with a crystalline propylene polymer segment as a side chain, and with an amorphous propylene copolymer segment as a main chain, and this can be confirmed also from the fact that the intermediate components and the high-temperature components, obtained by temperature rising elution fractionation using ODCB solvent, show the following characteristics.

(1) Fractionation of the Intermediate Components and the High-Temperature Components with ODCB The intermediate components mean components insoluble to ODCB at 5° C. but soluble to ODCB at 60° C., obtained by a known temperature rising elution fractionation method. In addition, the high-temperature components mean components insoluble to ODCB at 101° C., obtained by a known temperature rising elution fractionation method. The temperature rising elution fractionation method is a measurement method disclosed, for example, in Macromolecules, 21, 314 to 319 (1988).

Measurement of the intermediate components and high-temperature components is executed as follows. That is, glass beads carrier (80 to 100 mesh) are filled in a cylindrical column with a diameter of 50 mm and a height of 500 mm, and maintained at 140° C.

Then, 200 mL of an ODCB solution (10 mg/mL) of the sample dissolved at 140° C., is introduced into the column. Then, temperature of the column is cooled to 5° C. in a cooling rate of 10° C./hr, and maintained at 5° C. for 1 hour. It should be noted that temperature control precision throughout a series of operation is set to ±1° C.

Then, while maintaining column temperature at 5° C., by flowing 800 mL of ODCB at 5° C. in a flow rate of 20 mL/min., the components dissolved in ODCB at 5° C., present in the column, are eluted and removed.

Then, the column temperature is raised up to 60° C. in a temperature increasing rate of 10° C./hr, and after the column is stood still at 60° C. for 1 hour, by flowing 800 mL of a solvent (ODCB) at 60° C. in a flow rate of 20 mL/min., the components insoluble to ODCB at 5° C. but soluble in ODCB at 60° C. are eluted and recovered.

The ODCB solution, containing the components insoluble to ODCB at 5° C. but soluble in ODCB at 60° C., is concentrated to 20 mL by using an evaporator, and then deposited into methanol in 5 times amount. The deposited polymer is filtered and recovered, and then dried overnight with a vacuum drier. This portion is used as "the intermediate components" in the present invention.

Then, the column temperature is raised up to 101° C. in a temperature increasing rate of 10° C./hr, and after the column is stood still at 101° C. for 1 hour, by flowing 800 mL of a solvent (ODCB) at 101° C. in a flow rate of 20 mL/min., the components insoluble to ODCB at 60° C. but soluble in ODCB at 101° C. are eluted.

Then, the column temperature is raised up to 140° C. in a temperature increasing rate of 10° C./hr, and after the column is stood still at 140° C. for 1 hour, by flowing 800 mL of a solvent (ODCB) at 140° C. in a flow rate of 20 mL/min., the components insoluble to ODCB at 101° C. are eluted.

The ODCB solution, containing the components insoluble to ODCB at 101° C., is concentrated to 20 mL by using an evaporator, and then deposited into methanol in 5 times amount. The deposited polymer is filtered and recovered, and then dried overnight with a vacuum drier. This portion is used as "the high-temperature components" in the present invention.

(2) Characteristics of the Intermediate Components

In addition, weight average molecular weight (Mw), measured with GPC, of the intermediate components is 100,000 to 1,000,000, and when ethylene units are contained, ethylene content is 10 to 25% by weight.

(3) Characteristics of the High-Temperature Components

The high-temperature components are usually fractions of high-crystallinity components eluted, however, in the propylene-based polymer of the present invention, due to chemical bonding of the amorphous propylene copolymer segment to the crystalline propylene polymer segment, monomer units (ethylene) contained in the amorphous propylene copolymer are detected in this fraction.

(Ethylene Content and Composition of the High-Temperature Components):

The intermediate components recovered by the above method, from the polymer manufactured in Production Example 1, was 39.5% by weight relative to the polymer in total. Ethylene content thereof, measured with $^{13}C$-NMR, was 18.4% by mol.

In addition, calculation results of assignments on triad sequence distribution of the ethylene and propylene (PPP, PPE, EPE, PEP, PEE and EEE), according to a method of Macromolecules, 15, 1150 (1982), were as follows.
[PPP]: 0.600
[PPE]: 0.200
[EPE]: 0.022
[PEP]: 0.099
[PEE]: 0.048
[EEE]: 0.031

In addition, r1×r2, which is an index of randomness degree, was determined using the above the triad sequence distribution, by the following equation, and found to be r1×r2=1.1.

$$r1 \times r2 = ([PPE] \times [PEE])/(4 \times [PEP] \times [EPE])$$

Subsequently, 29.5% by weight of the high-temperature components relative to the polymer in total, was obtained by recovery. This ethylene content was measured by using $^{13}C$-NMR, and was 1.1% by mol. In addition, melting point of the high-temperature components was measured using DSC, and a single peak of 155.4° C. derived from polypropylene, was observed.

In addition, calculation results of each chain fraction, similarly as in the intermediate components, were as follows.
[PPP]: 0.976
[PPE]: 0.012
[EPE]: 0.001
[PEP]: 0.007
[PEE]: 0.004
[EEE]: 0.001

In addition, r1×r2, which is an index of randomness degree, was determined similarly, and found to be r1×r2=1.7. Because this value is 2 or lower, it is estimated that ethylene is randomly distributed.

(Discussion):

Usually, highly crystalline polyethylene dissolves into o-dichlorobenzene at 101° C., for example, even HDPE. Therefore, the fact that ethylene contained in the high-temperature components of the polymer of Example 1, is detected shows presence of not a simple mixture of highly crystalline polyethylene components and highly crystalline polypropylene components, but a chemically bonded compound of the highly crystalline segments and the segments containing the ethylene component.

In addition, it is clear that the crystalline polyethylene components are not contained in the high-temperature components, also from the fact that as melting point of the high-temperature components with DSC, only a single peak of 155.4° C. derived from the crystalline propylene components, is observed.

In addition, a structure thereof is considered, from a production method, to be a branched structure with a crystalline propylene polymer segment as a side chain, and with an amorphous propylene copolymer segment as a main chain.

In addition, determination results of ratio of three chain distribution of the intermediate components and the high-temperature components, are as follows, except PPP chain.
[PPE] intermediate components: 0.499
[EPE] intermediate components: 0.055
[PEP] intermediate components: 0.248
[PEE] intermediate components: 0.121
[EEE] intermediate components: 0.078
[PPE] high-temperature components: 0.496
[EPE] high-temperature components: 0.036
[PEP] high-temperature components: 0.269
[PEE] high-temperature components: 0.149
[EEE] high-temperature components: 0.049

The above results show that both fractions have similar composition distribution, and it shows containment of the amorphous propylene copolymer segments having similar composition distribution, in the intermediate components and the high-temperature components. That is, it is considered that the amorphous propylene copolymer segments and the crystalline propylene polymer segments are chemically bonded, and the amorphous components are eluted at different temperature by difference of ratio of the crystalline propylene polymer segments, even though composition distributions thereof are similar.

The propylene-based polymer of the present invention has excellent balance of mechanical properties, as well as improved melt fluidity, and excellent moldability and appearance, therefore can be used widely in various molded articles in various molding fields, for example, various industrial use injection molded parts, various containers, unstretched films, mono-axially stretched films, bi-axially stretched films, sheets, pipes, fibers etc. In addition, a production method for the propylene-based polymer of the present invention has high productivity and high industrial applicability.

Still more, the resin composition of the present invention has remarkably enhanced impact resistance, while maintaining nearly the same rigidity, and excellent rigidity-impact resistance valance, therefore, is useful as various industrial materials starting from interior and exterior materials of vehicles such as automobiles, or wrapping and packaging materials such as electric appliances, and is one having high industrial applicability.

What is claimed is:

1. A propylene-based polymer comprising component (A) insoluble in p-xylene at 25° C. and component (B) soluble in p-xylene at 25° C., wherein (i) a weight average molecular weight (Mw) measured with GPC is from 100,000 to 1,000,000, (ii) a content of a component insoluble in p-xylene at 140° C. is 0.3% by weight or lower, and (iii) a degree of strain hardening ($\lambda$ max) in measurement of elongational viscosity is 2.0 or higher, wherein
    the component (A) is the component insoluble in p-xylene at 25° C. (CXIS) comprising following characteristics (A1) to (A5) wherein:
    (A1) a content thereof is 20% by weight or more and less than 95% by weight relative to total weight of the polymer;
    (A2) a weight average molecular weight (Mw) measured with GPC is 100,000 to 1,000,000;
    (A3) an isotactic triad fraction (mm) measured with $^{13}$C-NMR is 93% or more;
    (A4) a degree of strain hardening (X max) in measurement of elongational viscosity is 2.0 or higher; and
    (A5) said component (A) insoluble in p-xylene at 25° C. (CXIS) comprises a propylene unit and an ethylene unit or an $\alpha$-olefin unit, and
    the component (B) is the component soluble in p-xylene at 25° C. (CXS) comprising following characteristics (B1) to (B3) wherein:
    (B1) a content thereof is 5% by weight or more and less than 80% by weight relative to total weight of the polymer;
    (B2) a weight average molecular weight (Mw) measured with GPC is 100,000 to 1,000,000; and
    (B3) said component (B) soluble in p-xylene at 25° C. (CXS) comprises a propylene unit and an ethylene unit and/or an $\alpha$-olefin unit.

2. The propylene-based polymer according to claim 1, wherein, said component (B) further comprises a characteristic (B4) wherein (B4) a degree of strain hardening ($\lambda$ max) in measurement of elongational viscosity is equal to or higher than 2.0.

3. The propylene-based polymer according to claim 1, wherein the propylene-base polymer has a branched structure comprising a crystalline propylene polymer segment as a side chain, and an amorphous propylene copolymer segment as a main chain.

4. The propylene-based polymer according to claim 1, wherein said component (A) has a branched structure comprising a crystalline propylene polymer segment as a side chain, and an amorphous propylene copolymer segment as a main chain.

5. The propylene-based polymer according to claim 1, wherein said component (A) comprises at least one ethylene unit, and the ethylene content is 0.1 to 10% by weight.

6. The propylene-based polymer according to claim 1, wherein said component (B) comprises at least one ethylene unit, and the ethylene content is 10 to 60% by weight.

7. A method for producing the propylene-based polymer according to claim 1 in the presence of a catalyst comprising components (a), (b), and (c), the method comprising:
    (i) polymerizing propylene only, or propylene and at least one of ethylene and an $\alpha$-olefin wherein ethylene, the $\alpha$-olefin or total amount of ethylene and the $\alpha$-olefin is polymerized in an amount of 0 to 10% by weight relative to total monomer components; and
    (ii) polymerizing propylene and at least one of ethylene and an $\alpha$-olefin wherein ethylene, the $\alpha$-olefin or total amount of ethylene and the $\alpha$-olefin is polymerized in an amount of 10 to 90% by weight relative to total monomer components,
    wherein said components (a), (b), and (c) are:
    (a): a metallocene compound of formula (1):

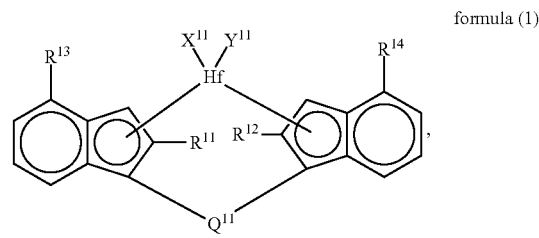

formula (1)

wherein each of $R^{11}$ and $R^{12}$ represents independently an alkyl group having carbon atoms of 1 to 6, an aryl group having carbon atoms of 6 to 16, an aryl group having a halogen and carbon atoms of 6 to 16, a heterocyclic group having nitrogen, oxygen or sulfur and carbon atoms of 4 to 16, and at least one of $R^{11}$ and $R^{12}$ represents a heterocyclic group having nitrogen, oxygen or sulfur and carbon atoms of 4 to 16;
    each of $R^{13}$ and $R^{14}$ represents independently an alkyl group having a halogen and carbon atoms of 1 to 6, an aryl group having carbon atoms of 6 to 16, an aryl group having a halogen and carbon atoms of 6 to 16, an aryl group having silicon and carbon atoms of 6 to 16, and a heterocyclic group having nitrogen, oxygen or sulfur and carbon atoms of 6 to 16;
    $X^{11}$ and $Y^{11}$ each independently represent a hydrogen atom, a halogen atom, a hydrocarbon group having carbon atoms of 1 to 20, a hydrocarbon group having silicon and carbon atoms of 1 to 20, a halogenated hydrocarbon group having carbon atoms of 1 to 20, a hydrocarbon group having oxygen and carbon atoms of 1 to 20, an amino group, or a hydrocarbon group having nitrogen and carbon atoms of 1 to 20; and
    $Q^{11}$ represents a bivalent hydrocarbon group having carbon atoms of 1 to 20, a silylene group or a germylene group which may have a hydrocarbon group having carbon atoms of 1 to 20;
    (b): an ion-exchange layered silicate; and
    (c): an organoaluminum compound.

8. The method for producing the propylene-based polymer according to claim 7, wherein said (i) polymerizing propylene only, or propylene and at least one of ethylene and an $\alpha$-olefin comprises bulk polymerizing using propylene as a solvent, or gas-phase polymerizing wherein each monomer is maintained in an gaseous state, and said (ii) polymerizing propylene and at least one of ethylene and an $\alpha$-olefin comprises gas-phase polymerizing.

9. A method of modifying a propylene-ethylene copolymer (Z), comprising:
   modifying the propylene-ethylene copolymer (Z) with the polymer of claim 1,
   wherein the propylene-ethylene copolymer (Z) is obtained by a process comprising sequentially producing, by a multi-stage polymerization method, a crystalline propylene polymer component and a propylene-ethylene random copolymer component, in the presence of a Ziegler-Natta catalyst.

10. A resin composition comprising a propylene-ethylene copolymer component (Z) in an amount of 50.0 to 99.9% by weight, and a propylene-based polymer component (M) in an amount of 0.1 to 50.0% by weight, wherein
   the propylene-ethylene copolymer component (Z) is obtained by sequential production by a multi-stage polymerization method of a crystalline propylene polymer component and a propylene-ethylene random copolymer component, and has following (Z1) characteristics, wherein
   (Z1): an amount of the component (CXS-Z) soluble in p-xylene at 25° C. in the component (Z) is 5 to 50% by weight relative to total amount of the component (Z), and amount of the component (CXIS-Z) insoluble in p-xylene at 25° C. in the component (Z) is 50 to 95% by weight relative to total amount of the component (Z), and
   the propylene-based polymer component (M) is obtained by sequential production by a multi-stage polymerization method of a crystalline propylene polymer component and a propylene-ethylene random copolymer component, comprises a component (A) insoluble in p-xylene at 25° C. and a component (B) soluble in p-xylene at 25° C., has a structure wherein the crystalline propylene polymer segment and an amorphous propylene copolymer segment are chemically bonded, and has following (A1) and (B1) characteristics, wherein:
   (A1): an amount of the component (A) is 20 to 95% by weight relative to total amount of the component (M); and
   (B1): an amount of the component (B) is 5 to 80% by weight relative to total amount of the component (M).

11. The resin composition according to claim 10, wherein said component (Z) is produced by using a Ziegler-Natta-based catalyst.

12. The resin composition according to claim 10, wherein chemical bond type of said component (M) is a branched structure comprising an amorphous propylene copolymer segment as a main chain, and a crystalline propylene polymer segment as a side chain.

13. The resin composition according to claim 10, wherein a degree of strain hardening ($\lambda$ max) of said component (M) in measurement of elongational viscosity is 2.0 or higher.

14. The resin composition according to claim 10, wherein a content of said component (B) is 0.2 to 10% by weight relative to total amount of the composition.

15. A resin composition comprising 0 to 70 parts by weight of ethylene/$\alpha$-olefin-based elastomer or styrene-based elastomer, and 0 to 70 parts by weight of an inorganic filler, relative to 100 parts by weight of the resin composition according to claim 10.

16. A resin composition comprising a propylene-ethylene copolymer component (Z) in an amount of 50.0 to 99.9% by weight, and a propylene-based polymer component (M) in an amount of 0.1 to 50.0% by weight, wherein
   the propylene-ethylene copolymer component (Z) is obtained by sequential production by a multi-stage polymerization method of a crystalline propylene polymer component and a propylene-ethylene random copolymer component, and has following (Z1) characteristics, wherein
   (Z1): an amount of the component (CXS-Z) soluble in p-xylene at 25° C. in the component (Z) is 5 to 50% by weight relative to total amount of the component (Z), and amount of the component (CXIS-Z) insoluble in p-xylene at 25° C. in the component (Z) is 50 to 95% by weight relative to total amount of the component (Z), and
   the propylene-based polymer component (M) is produced sequentially by a multi-stage polymerization method, wherein the propylene-based polymer component (M) comprises a component (A) insoluble in p-xylene at 25° C. comprising (A 1) to (A4) characteristics, a component (B) soluble in p-xylene at 25° C. comprising (B1) to (B2) characteristics, and (M1) to (M3) characteristics, wherein:
   (M1): a weight average molecular weight (Mw) of the component (M), measured with GPC is 100,000 to 1,000,000,
   (M2): a content of component insoluble in p-xylene at 140° C. in the component (M) is 0.3% by weight or lower relative to total amount of the component (M),
   (M3): a degree of strain hardening (k max) of said component (M) in measurement of elongational viscosity is 2.0 or higher,
   (A1): an amount of the component (A) is 20 to 95% by weight relative to total amount of the component (M),
   (A2): a weight average molecular weight (Mw) of the component (A) measured with GPC is 100,000 to 1,000,000,
   (A3): an isotactic triad fraction (mm) of the component (A), measured with $^{13}$C-NMR is 93% or more, and
   (A4): a degree of strain hardening (X, max) of the component (A), in measurement of elongational viscosity is 2.0 or higher,
   (B1): an amount of the component (B) is 5 to 80% by weight relative to total amount of the component (M), and
   (B2): a weight average molecular weight (Mw) of the component (B), measured with GPC, is 100,000 to 1,000,000.

17. The resin composition according to claim 16, wherein said component (B) comprises at least one ethylene unit, and the ethylene content is 10 to 60% by weight.

18. The resin composition according to claim 16, wherein, said component (B), further comprises a characteristic (B4) wherein (B4) the degree of strain hardening ($\lambda$ max) in measurement of elongational viscosity is 2.0 or higher.

19. The resin composition according to claim 16, wherein a content of said component (B) is 0.2 to 10% by weight relative to total amount of the composition.

20. A resin composition comprising 0 to 70 parts by weight of ethylene/$\alpha$-olefin-based elastomer or styrene-based elastomer, and 0 to 70 parts by weight of an inorganic filler, relative to 100 parts by weight of the resin composition according to claim 16.

* * * * *